United States Patent
Patil et al.

(10) Patent No.: US 8,175,613 B2
(45) Date of Patent: May 8, 2012

(54) SYSTEMS AND METHODS FOR DETERMINING LOCATION OF DEVICES WITHIN A WIRELESS NETWORK

(75) Inventors: Abhishek Patil, San Diego, CA (US);
Xudong Wang, Kirkland, WA (US);
Chao Gui, San Diego, CA (US); Weilin Wang, San Diego, CA (US); Michael Nova, Del Mar Mesa, CA (US)

(73) Assignee: Misonimo Chi Acquisitions L.L.C., Dover, DE (US)

( * ) Notice: Subject to any disclaimer, the term of this patent is extended or adjusted under 35 U.S.C. 154(b) by 955 days.

(21) Appl. No.: 11/741,630

(22) Filed: Apr. 27, 2007

(65) Prior Publication Data
US 2008/0032705 A1   Feb. 7, 2008

Related U.S. Application Data

(63) Continuation-in-part of application No. 11/462,663, filed on Aug. 4, 2006, now Pat. No. 7,957,356, and a continuation-in-part of application No. 11/615,582, filed on Dec. 22, 2006, now Pat. No. 7,941,149.

(51) Int. Cl.
*H04Q 7/22* (2006.01)
(52) U.S. Cl. .................................. 455/456.1
(58) Field of Classification Search ............... 455/456.1
See application file for complete search history.

(56) References Cited

U.S. PATENT DOCUMENTS

| | | | |
|---|---|---|---|
| 4,706,689 A * | 11/1987 | Man | 600/302 |
| 5,309,437 A | 5/1994 | Perlman et al. | |
| 5,699,355 A | 12/1997 | Natarajan | |
| 5,844,905 A | 12/1998 | McKay et al. | |
| 5,940,771 A | 8/1999 | Gollnick et al. | |
| 5,943,322 A | 8/1999 | Mayor et al. | |
| 5,959,999 A | 9/1999 | An | |
| 6,003,007 A | 12/1999 | DiRienzo | |
| 6,023,563 A | 2/2000 | Shani | |
| 6,076,066 A | 6/2000 | DiRienzo | |
| 6,122,516 A | 9/2000 | Thompson et al. | |
| 6,161,104 A | 12/2000 | Stakutis et al. | |
| 6,173,387 B1 | 1/2001 | Baxter et al. | |
| 6,199,115 B1 | 3/2001 | DiRienzo | |
| 6,208,629 B1 | 3/2001 | Jaszewski et al. | |
| 6,226,642 B1 | 5/2001 | Beranek et al. | |
| 6,226,684 B1 | 5/2001 | Sung et al. | |

(Continued)

FOREIGN PATENT DOCUMENTS

WO   2004104722   12/2004

(Continued)

OTHER PUBLICATIONS

International Search Report for PCT/US07/69031 dated Jan. 22, 2008.

(Continued)

*Primary Examiner* — Jinsong Hu
*Assistant Examiner* — Jean Chang

(57) ABSTRACT

Systems and methods for determining a location of a device with a wireless network. Characteristics of signals received from the device at a plurality of nodes are measured. Based upon the measurements, estimates of the range from the device to the nodes are made. Then, based upon the estimated ranges, and knowing the location of the nodes, a location of the device is determined.

41 Claims, 12 Drawing Sheets

U.S. PATENT DOCUMENTS

| | | |
|---|---|---|
| 6,236,662 B1 | 5/2001 | Reilly |
| 6,272,492 B1 | 8/2001 | Kay |
| 6,282,513 B1 | 8/2001 | Strawder |
| 6,289,316 B1 | 9/2001 | Aghili et al. |
| 6,292,596 B1 | 9/2001 | Snyder et al. |
| 6,330,244 B1 | 12/2001 | Swartz et al. |
| 6,331,762 B1 | 12/2001 | Bertness |
| 6,336,114 B1 | 1/2002 | Garrison |
| 6,338,093 B1 | 1/2002 | DiRienzo |
| 6,343,310 B1 | 1/2002 | DiRienzo |
| 6,345,260 B1 | 2/2002 | Cummings, Jr. et al. |
| 6,349,334 B1 | 2/2002 | Faupel et al. |
| 6,356,992 B1 | 3/2002 | Baxter et al. |
| 6,357,010 B1 | 3/2002 | Viets et al. |
| 6,366,683 B1 | 4/2002 | Langlotz |
| 6,366,912 B1 | 4/2002 | Wallent et al. |
| 6,366,929 B1 | 4/2002 | Dartigues et al. |
| 6,385,730 B2 | 5/2002 | Garrison |
| 6,414,955 B1 | 7/2002 | Clare et al. |
| 6,418,549 B1 | 7/2002 | Ramchandran et al. |
| 6,434,191 B1 | 8/2002 | Agrawal et al. |
| 6,460,128 B1 | 10/2002 | Baxter et al. |
| 6,480,497 B1 | 11/2002 | Flammer, III et al. |
| 6,526,534 B1 | 2/2003 | Nagoya |
| 6,625,605 B1 | 9/2003 | Terakura et al. |
| 6,628,636 B1 | 9/2003 | Young |
| 6,640,087 B2 | 10/2003 | Reed et al. |
| 6,665,311 B2 | 12/2003 | Kondylis et al. |
| 6,671,840 B1 | 12/2003 | Nagoya et al. |
| 6,687,259 B2 | 2/2004 | Alapuranen |
| 6,694,313 B1 | 2/2004 | Roemer |
| 6,704,321 B1 | 3/2004 | Kamiya |
| 6,754,188 B1 | 6/2004 | Garahi et al. |
| 6,754,499 B1 | 6/2004 | Smith |
| 6,760,877 B1 | 7/2004 | Lappetelainen et al. |
| 6,763,007 B1 | 7/2004 | La Porta et al. |
| 6,763,013 B2 | 7/2004 | Kennedy |
| 6,788,702 B1 | 9/2004 | Garcia-Luna-Aceves et al. |
| 6,791,949 B1 | 9/2004 | Ryu et al. |
| 6,795,418 B2 | 9/2004 | Choi |
| 6,807,165 B2 | 10/2004 | Belcea |
| 6,839,541 B2 | 1/2005 | Alzoubi et al. |
| 6,845,084 B2 | 1/2005 | Rangnekar et al. |
| 6,850,502 B1 | 2/2005 | Kagan et al. |
| 6,850,511 B2 | 2/2005 | Kats et al. |
| 6,853,641 B2 | 2/2005 | Lindhorst-Ko et al. |
| 6,865,371 B2 | 3/2005 | Salonidis et al. |
| 6,868,072 B1 | 3/2005 | Lin et al. |
| 6,870,846 B2 | 3/2005 | Cain |
| 6,879,570 B1 | 4/2005 | Choi |
| 6,894,985 B2 | 5/2005 | Billhartz |
| 6,904,021 B2 | 6/2005 | Belcea |
| 6,907,257 B1 | 6/2005 | Mizutani et al. |
| 6,909,721 B1 | 6/2005 | Ekberg et al. |
| 6,912,215 B1 | 6/2005 | Lin et al. |
| 6,948,048 B2 | 9/2005 | Baxter et al. |
| 6,950,418 B1 | 9/2005 | Young et al. |
| 6,961,310 B2 | 11/2005 | Cain |
| 6,965,575 B2 | 11/2005 | Srikrishna et al. |
| 6,970,714 B2 | 11/2005 | D'Souza et al. |
| 6,975,613 B1 | 12/2005 | Johansson |
| 6,975,614 B2 | 12/2005 | Kennedy |
| 6,980,524 B1 | 12/2005 | Lu et al. |
| 6,985,476 B1 | 1/2006 | Elliott et al. |
| 6,986,161 B2 | 1/2006 | Billhartz |
| 6,990,092 B1 | 1/2006 | Siala |
| 6,993,358 B2 | 1/2006 | Shiotsu et al. |
| 7,002,944 B2 | 2/2006 | Kats et al. |
| 7,003,313 B2 | 2/2006 | Garces et al. |
| 7,007,102 B2 | 2/2006 | Billhartz et al. |
| 7,016,328 B2 | 3/2006 | Chari et al. |
| 7,027,426 B2 | 4/2006 | Billhartz |
| 7,031,293 B1 | 4/2006 | Srikrishna et al. |
| 7,035,207 B2 | 4/2006 | Winter et al. |
| 7,046,639 B2 | 5/2006 | Garcia-Luna-Aceves et al. |
| 7,046,649 B2 | 5/2006 | Awater et al. |
| 7,047,473 B2 | 5/2006 | Hwang et al. |
| 7,050,806 B2 | 5/2006 | Garces et al. |
| 7,050,819 B2 | 5/2006 | Schwengler et al. |
| 7,053,770 B2 | 5/2006 | Ratiu et al. |
| 7,054,126 B2 | 5/2006 | Strutt et al. |
| 7,058,021 B2 | 6/2006 | Srikrishna et al. |
| 7,061,895 B1 | 6/2006 | Habetha |
| 7,062,286 B2 | 6/2006 | Grivas et al. |
| 7,069,483 B2 | 6/2006 | Gillies |
| 7,075,414 B2 | 7/2006 | Giannini et al. |
| 7,082,111 B2 | 7/2006 | Amouris |
| 7,082,115 B2 | 7/2006 | Bauer et al. |
| 7,089,066 B2 | 8/2006 | Hesse et al. |
| 7,091,852 B2 | 8/2006 | Mason et al. |
| 7,095,732 B1 | 8/2006 | Watson, Jr. |
| 7,116,983 B2 | 10/2006 | Lan et al. |
| 7,139,336 B2 | 11/2006 | Nefedov |
| 7,151,777 B2 | 12/2006 | Sawey |
| 7,233,584 B2 | 6/2007 | Nguyen et al. |
| 7,245,947 B2 | 7/2007 | Salokannel et al. |
| 7,251,224 B2 | 7/2007 | Ades et al. |
| 7,269,198 B1 | 9/2007 | Elliott et al. |
| 7,280,555 B2 | 10/2007 | Stanforth et al. |
| 7,301,958 B2 | 11/2007 | Borkowski et al. |
| 7,324,824 B2 * | 1/2008 | Smith et al. ................ 455/456.1 |
| 7,376,099 B2 | 5/2008 | Tseng et al. |
| 7,379,447 B2 | 5/2008 | Dunagan et al. |
| 7,388,849 B2 | 6/2008 | Kim et al. |
| 7,395,073 B2 * | 7/2008 | Gwon et al. ................ 455/456.1 |
| 7,418,523 B2 | 8/2008 | Pettyjohn et al. |
| 7,428,523 B2 | 9/2008 | Tsang et al. |
| 7,451,365 B2 | 11/2008 | Wang et al. |
| 7,496,059 B2 | 2/2009 | Yoon |
| 7,522,537 B2 | 4/2009 | Joshi |
| 7,609,641 B2 | 10/2009 | Strutt et al. |
| 7,688,808 B2 | 3/2010 | Ren et al. |
| 7,701,858 B2 | 4/2010 | Werb et al. |
| 2003/0126291 A1 | 7/2003 | Wang et al. |
| 2003/0142624 A1 | 7/2003 | Chiussi et al. |
| 2003/0157951 A1 | 8/2003 | Hasty |
| 2003/0161268 A1 | 8/2003 | Larsson et al. |
| 2003/0179742 A1 | 9/2003 | Ogier et al. |
| 2003/0193908 A1 | 10/2003 | Cain |
| 2003/0212821 A1 | 11/2003 | Gillies |
| 2003/0212941 A1 | 11/2003 | Gillies et al. |
| 2003/0224787 A1 | 12/2003 | Gandolfo |
| 2004/0109428 A1 | 6/2004 | Krishnamurthy |
| 2004/0147223 A1 | 7/2004 | Cho |
| 2004/0192713 A1 | 7/2004 | Cho |
| 2004/0152416 A1 | 8/2004 | Dahl |
| 2004/0198375 A1 * | 10/2004 | Schwengler et al. ....... 455/456.1 |
| 2004/0204084 A1 | 10/2004 | Tan et al. |
| 2004/0229566 A1 | 11/2004 | Wang et al. |
| 2005/0002366 A1 | 1/2005 | Toskala et al. |
| 2005/0026621 A1 | 2/2005 | Febvre et al. |
| 2005/0083971 A1 | 4/2005 | Delaney et al. |
| 2005/0090266 A1 * | 4/2005 | Sheynblat ................ 455/456.1 |
| 2005/0111475 A1 | 5/2005 | Borkowski et al. |
| 2005/0141453 A1 | 6/2005 | Zhu |
| 2005/0190770 A1 | 9/2005 | Saniee et al. |
| 2005/0201315 A1 | 9/2005 | Lakkis |
| 2005/0201340 A1 | 9/2005 | Wang et al. |
| 2005/0201346 A1 | 9/2005 | Wang et al. |
| 2005/0221752 A1 | 10/2005 | Jamieson et al. |
| 2005/0232179 A1 | 10/2005 | daCosta et al. |
| 2006/0104205 A1 | 5/2006 | Strutt et al. |
| 2006/0104292 A1 | 5/2006 | Gupta |
| 2006/0128376 A1 | 6/2006 | Alexis |
| 2006/0128402 A1 | 6/2006 | Lee et al. |
| 2006/0182142 A1 | 8/2006 | Schmidt |
| 2006/0198339 A1 | 9/2006 | Marinier et al. |
| 2006/0215583 A1 | 9/2006 | Castagnoli |
| 2006/0215593 A1 | 9/2006 | Wang |
| 2006/0240843 A1 * | 10/2006 | Spain et al. ................ 455/456.1 |
| 2006/0253747 A1 | 11/2006 | Gillies |
| 2006/0268908 A1 | 11/2006 | Wang |
| 2007/0049342 A1 | 3/2007 | Mayer et al. |
| 2007/0076673 A1 | 4/2007 | Joshi |
| 2007/0076697 A1 | 4/2007 | Huotari et al. |
| 2007/0104215 A1 | 5/2007 | Wang |
| 2007/0110102 A1 | 5/2007 | Yagyuu et al. |

| | | | |
|---|---|---|---|
| 2007/0159991 A1* | 7/2007 | Noonan et al. | 370/310 |
| 2007/0201421 A1* | 8/2007 | Huseth | 370/338 |
| 2007/0211682 A1 | 9/2007 | Kim et al. | |
| 2007/0230447 A1 | 10/2007 | Hahn et al. | |
| 2007/0247367 A1* | 10/2007 | Anjum et al. | 342/464 |
| 2007/0247368 A1* | 10/2007 | Wu | 342/465 |
| 2007/0258508 A1 | 11/2007 | Werb et al. | |
| 2007/0294226 A1* | 12/2007 | Chahal et al. | 707/3 |
| 2008/0031169 A1 | 2/2008 | Shi | |
| 2008/0037723 A1 | 2/2008 | Milstein et al. | |
| 2008/0069071 A1 | 3/2008 | Tang | |
| 2008/0080378 A1 | 4/2008 | Kim et al. | |
| 2008/0192713 A1 | 8/2008 | Mighani et al. | |
| 2008/0259895 A1 | 10/2008 | Habetha et al. | |
| 2009/0073924 A1 | 3/2009 | Chou | |

FOREIGN PATENT DOCUMENTS

| | | |
|---|---|---|
| WO | 2004104850 | 12/2004 |
| WO | 2007/143554 | 12/2007 |
| WO | 2008/070871 | 6/2008 |

OTHER PUBLICATIONS

Tang et al., "Hop Reservation Multiple Access (HRMA) for Multichannel Packet Radio Networks," IEEE Computer Communications Networks, 1998 Proceedings, 7th International Conference, p. 388-395, Oct. 12-15, 1998.

Tang et al., "A Protocol for Topology-Dependent Transmission Scheduling in Wireless Networks," IEEE Wireless Communication and Networking Conference 1999 (WCNC '99), p. 1333-1337 Sep. 1999.

Bao et al., "Collision-Free Topology-Dependent Channel Access Scheduling," Oct. 22, 2000-Oct. 25, 2000, MILCOM 2000. 21st Century Military Communication Conference Proceedings, vol. 1, pp. 507-511.

Bao et al., "Distributed dynamic access scheduling for ad hoc networks," Journal of Parallel and Distributed Computing, Apr. 13, 2003, Elsevier Science, vol. 63, Issue 1, pp. 3-14.

Tang et al., "Interference-Aware Topology Control and QoS Routing in Multi-Channel Wireless Mesh Networks, 2005, International Symposium on mobile Ad Hoc Networking and Computing," Proceedings of the 6th ACM International Symposium on Mobile ad hoc networking and computing, pp. 68-77.

Written Opinion for PCT/US07/69031 mailed Jan. 22, 2008 (pp. 1-4).

Alicherry, Mansoor et al., "Joint Channel Assignment and Routing for Throughput Optimization in Multi-radio Wireless Mesh Networks," MobiHoc'05, pp. 58-72 (Aug. 28-Sep. 2, 2005).

Bahl, Paramvir et al., "SSCH: Slotted Seeded Channel Hopping for Capacity Improvement in IEEE 802.11 Ad-Hoc Wireless Networks," MobiCom'04, pp. 216-230 (Sep. 26-Oct. 1, 2004).

Kodialam, Murali et al., "Characterizing Achievable Rates in Multi-Hop Wireless Mesh Networks With Orthogonal Channels," IEEE/ACM Transactions on Networking, 13(4):868-880 (Aug. 2005).

Kodialam, Murali et al., "Characterizing the Capacity Region in Multi-Radio Multi-Channel Wireless Mesh Networks," MobiCom'05, pp. 73-87 (Aug. 28-Sep. 2, 2005).

Mishra, Arunesh et al., "Weighted Coloring based Channel Assignment for WLANs," Mobile Computing and Communications Review, 9(3):19-31 (2005).

Ramachandran, Krishna N. et al., "Interference-Aware Channel Assignment in Multi-Radio Wireless Mesh Networks," Proceedings IEEE Infocom, pp. 1-12 (Apr. 2006).

Raman, Bhaskaran, "Channel Allocation in 802.11-based Mesh Networks," Proceedings IEEE Infocom, pp. 1-10 (2006).

Raniwala, Ashish et al., "Architecture and Algorithms for an IEEE 802.11-Based Multi-Channel Wireless Mesh Network," IEEE, 2223-2234 (2005).

Raniwala, Ashish et al., "Centralized Channel Assignment and Routing Algorithms for Multi-Channel Wireless Mesh Networks," Mobile Computing and Communications Review, 8(2):50-65 (2004).

So, Jungmin et al., "Multi-Channel MAC for Ad Hoc Networks: Handling Multi-Channel Hidden Terminals Using a Single Transceiver," MobiHoc'04, pp. 222-233 (May 24-26, 2004).

Tang et al., "Interference-Aware Topology Control and QoS Routing in Multi-Channel Wireless Mesh Networks, 2005, International Symposium on mobile Ad Hoc Networking and Computing," Proceedings of the 6th ACM International Symposium on Mobile ad hoc networking and computing, pp. 68-77 (May 25-27, 2005).

Non-Final Office Action on U.S. Appl. No. 11/741,637, mailed Dec. 16, 2011.

* cited by examiner

SYSTEMS AND METHODS FOR DETERMINING LOCATION OF DEVICES WITHIN A WIRELESS NETWORK

RELATED APPLICATIONS

This application is a continuation-in-part of U.S. patent application Ser. No. 11/462,663, filed Aug. 4, 2006, which a continuation-in-part of co-pending U.S. patent application Ser. No. 10/816,481 filed on Apr. 1, 2004, which is a continuation-in-part of Ser. Nos. 10/437,128 and 10/437,129 filed May 13, 2003, which both claim the benefit of 60/380,425, filed May 13, 2002; and Ser. No. 11/462,663 is a continuation-in-part of co-pending U.S. patent application Ser. No. 11/076,738 filed on Mar. 9, 2005 which is a continuation-in-part of Ser. No. 10/816,481 filed Apr. 1, 2004, which is a continuation-in-part of Ser. Nos. 10/437,128 and 10/437,129, which both claim the benefit of 60/380,425 filed May 13, 2002, and Ser. No. 11/076,738 is also a continuation-in-part of Ser. Nos. 10/437,128 and 10/437,129 which both claim the benefit of provisional 60/380,425; and Ser. No. 11/462,663 is further a continuation-in-part of co-pending U.S. patent application Ser. No. 11/420,668 filed on May 26, 2006, which claims the benefit of 60/747,409 filed May 16, 2006, and Ser. No. 11/420,668 is further a continuation-in-part of Ser. No. 11/076,738 filed Mar. 9, 2005, which is a continuation-in-part of Ser. No. 10/816,481 filed Apr. 1, 2004, which is a continuation-in-part of Ser. Nos. 10/437,128 and 10/437,129, which both claim the benefit of provisional 60/380,425, and Ser. No. 11/076,738 is also a continuation-in-part of Ser. Nos. 10/437,128 and 10/437,129 which both claim the benefit of provisional 60/380,425; and a continuation-in-part of U.S. patent application Ser. No. 11/615,582, filed Dec. 22, 2006, which is a continuation-in-part of U.S. patent application Ser. No. 10/816,481 filed on Apr. 1, 2004, which is a continuation-in-part of U.S. patent applications Ser. No. 10/437,128 filed May 13, 2003 and Ser. No. 10/437,129 filed May 13, 2003, which both claim the benefit of 60/380,425 filed May 13, 2002; and Ser. No. 11/615,582 is also a continuation-in-part of U.S. patent application Ser. No. 11/076,738 filed Mar, 9, 2005 which claims priority to Ser. No. 10/816,481 filed Apr. 1, 2004, which is a continuation-in-part of Ser. Nos. 10/437,128 and 10/437,129, which both claim the benefit of 60/380,425 filed May 13, 2002, and Ser. No. 11/076,738 is also a continuation-in-part of Ser. Nos. 10/437,128 and 10/437,129 which both claim the benefit of provisional 60/380,425; and Ser. No. 11/615,582 is also a continuation-in-part of Ser. No. 11/420,668 filed on May 26, 2006, which claims the benefit of 60/747,409 filed May 16, 2006, and Ser. No. 11/420,668 is further a continuation-in-part of Ser. No. 11/076,738 filed Mar. 9, 2005, which is a continuation-in-part of Ser. No. 10/816,481 filed Apr. 1, 2004, which is a continuation-in-part of Ser. Nos. 10/437,128 and 10/437,129 which both claim the benefit of provisional 60/380,425, and Ser. No. 11/076,738 is also a continuation-in-part of Ser. Nos. 10/437,128 and 10/437,129 which both claim the benefit of provisional 60/380,425; and Ser. No. 11/615,582 is further a continuation-in-part of Ser. No. 11/462,663 filed on Aug. 4, 2006, which is a continuation-in-part to Ser. No. 10/816,481 filed Apr. 1, 2004 which is a continuation-in-part of Ser. Nos. 10/437,128 and 10/437,129, which both claim the benefit of 60/380,425 filed May 13, 2002, and Ser. No. 11/462,663 is also a continuation-in-part of Ser. No. 11/076,738 filed Mar. 9, 2005, which claims priority to Ser. No. 10/816,481 filed Apr. 1, 2004, and which is a continuation-in-part of Ser. Nos. 10/437,128 and 10/437,129, which both claim the benefit of 60/380,425 filed May 13, 2002, and Ser. No. 11/462,663 is also a continuation-in-part of Ser. No. 11/420,668 filed May 26, 2006 which claims the benefit of 60/747,409 filed May 16, 2006, and Ser. No. 11/420,668 is further a continuation-in-part of Ser. No. 11/076,738 filed Mar. 9, 2005, which is a continuation-in-part of Ser. No. 10/816,481 filed Apr. 1, 2004, which is a continuation-in-part of Ser. Nos. 10/437,128 and 10/437,129 which both claim the benefit of provisional 60/380,425, and Ser. No. 11/076,738 is also a continuation-in-part of Ser. Nos. 10/437,128 and 10/437,129 which both claim the benefit of provisional 60/380,425;

which are all hereby incorporated by reference in their entirety.

BACKGROUND

1. Field of the Invention

The present invention generally relates to wireless communication networks and more specifically to determining location of devices within the network.

2. Related Art

A typical wireless network includes a number of wireless nodes, such as switches and routers, and a number of client devices. Many client devices are mobile and can move about as they interact over the network. Because of the mobility of the client device, the physical location of the device is uncertain.

Recently, there have been many applications developed that take advantage of knowing the location of a client. These applications are sometime referred to as location based services ("LBS"). Examples of LBS include providing a client information based upon the client's location, such as providing driving directions from a clients present location to a desired destination.

Other location based applications include the area of public safety. One such safety application is E911, which is an enhanced emergency public safety program. In E911, cellular service providers are working with government agencies to provide the location of a cellular phone when it is used to dial 911.

In addition to cellular based systems, location applications can also be advantageous for wireless networks. For example, it is common for employees to take their laptop computers with them as they move about their office, for example, when attending a meeting on another floor of the office building. The laptops can access the company's network via a wireless connection. It would be desirable to be able to determine the location of the laptop, for example, in the case of an emergency this would provide information about the location of the employees.

While some location applications for mobile devices may be provided by cellular carriers, many wireless networks do not have access to a cellular system. In many wireless networks, the mobile devices are adapted to communicate with a local area network and not with a cellular network. In this situation, solutions developed for a cellular network will not support locating devices within the local area network.

Therefore, there is a need for a system and method that overcomes problems associated with determining the location of devices within a wireless network.

SUMMARY

The present invention provides systems and methods for determining the location of a device within a wireless network. In one embodiment, a method for determining a location of a device within a wireless network includes receiving a signal from the device at a plurality of nodes in the network, and measuring a characteristic of the signal received at the plurality of nodes in the network. Then, estimating a range from the device to each of the plurality of nodes based upon the measured characteristics, and determining a location of the device based upon the estimated ranges. In one embodiment the wireless network is a mesh network.

The received signal can be a radio frequency ("RF") signal, such as an ultra-wideband ("UWB") signal wireless fidelity (Wi.Fi.) signal, or other wireless network signal. Also, the measured characteristic can be the strength of the signal received at the node, or timing information, such as time of arrival or time difference of arrival. Determining the location can include triangulation, trilateration, weighting, estimating the location at the centroid of a region, or any combination of these techniques.

A node in a wireless network can include a wireless network interface configured to allow the node to send and receive data communications over a wireless communication network with a device in the network. The node can also include a processor configured to measure a characteristic of a signal received from the device and to communicate the measurements to a location server. In an embodiment the wireless network is a mesh network.

A location server in a wireless network can include a wireless network interface, such as a mesh network interface, configured to allow the server to communicate with nodes in the network. The location server also includes a processor configured to receive information about the physical location of the nodes in the network, and measurements of characteristic of signals received at a plurality of nodes from a device within the network, wherein the processor estimates a range from the device to the plurality of nodes and determines a location of the device based upon the ranges and the location of the nodes.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for systems and methods for determining location of a device communicating with a wireless network. While the following description is of locating a device in communication with a wireless network, the phrase "device" is used to distinguish and identify the object, or node, that is being located.

After reading this description it will become apparent to one skilled in the art how to implement the invention in various alternative embodiments and alternative applications. To facilitate a direct explanation of the invention, the present description will focus on embodiments where communication is carried out using traditional radio frequency ("RF") and ultra wideband ("UWB"), although the invention may be applied in alternative networks IEEE 802.11 802.15, 802.16, worldwide interoperability for microwave access ("WiMAX") network, wireless fidelity ("WiFi") network, wireless cellular network (e.g., wireless wide area network ("WAN"), ZigBee, and/or any other wireless communication network topology or protocol. Additionally, the described embodiment will also focus on a single radio embodiment although multi-radio embodiments and other multiple input multiple output ("MIMO") embodiments are certainly contemplated by the broad scope of the present invention. Therefore, it should be understood that the single radio embodiment described herein is presented by way of example only, and not limitation. As such, this detailed description should not be construed to limit the scope or breadth of the present invention as set forth in the appended claims.

Figure 1:
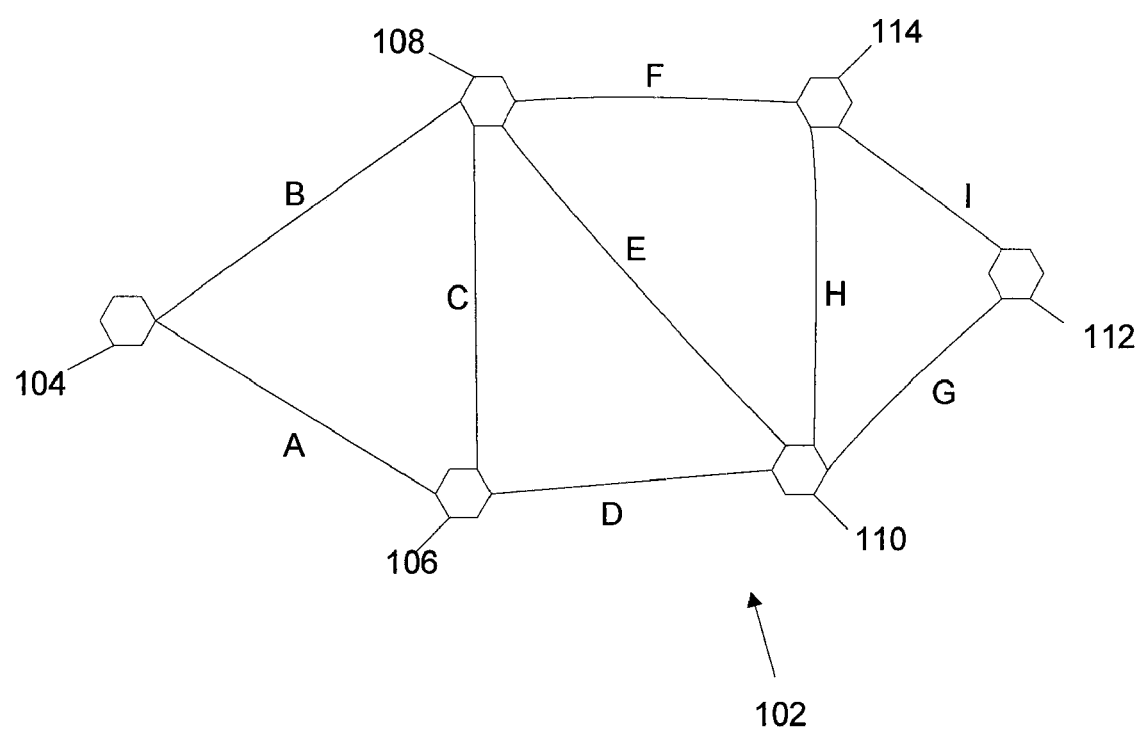
FIG. 1 is a network diagram illustrating an example wireless network in accordance with an embodiment of the invention.

FIG. 1 is a network diagram illustrating an example wireless network 102 in accordance with aspects of the present invention. In one embodiment, the wireless network 102 illustrated in FIG. 1 is a mesh network. A mesh network is a general network architecture that can include point-to-point, star, bus, hierarchical, partial or full mesh configurations. In the illustrated embodiment, the network 102 comprises a plurality of wireless communication devices, or nodes (also referred to herein as "wireless nodes" or "wireless devices") such as wireless nodes 104, 106, 108, 110, 112, and 114. Additionally illustrated are several wireless communication paths (also referred to herein as "links") between the various wireless nodes, for example link A between node 104 and node 106. A path may also comprise a plurality of links, such as the path between node 104 and 106 that includes links B, and C, or alternatively, links B, E, and D. Such conventional communications between nodes in wireless communication network (also referred to herein as an "ad hoc network" or "wireless network" or "wireless ad hoc network" or "mesh network" or some combination of these) will be understood by one having skill in the art.

Furthermore, each wireless node in the illustrated diagram has a maximum communication distance within the wireless communication network. This distance is not shown, however, it can be understood such that node 104 cannot directly communicate with node 112 and vice versa.

Figure 2:
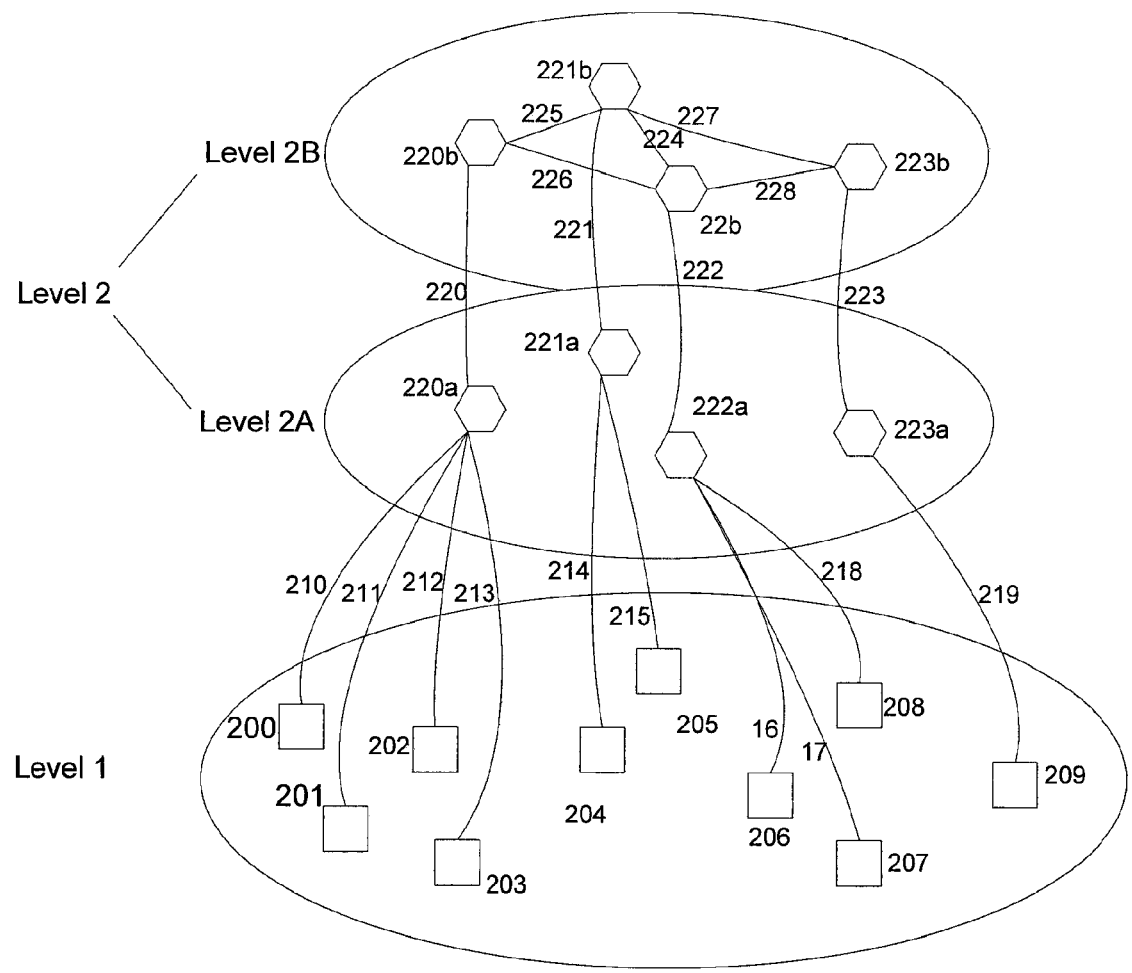
FIG. 2 is a network diagram illustrating another example wireless network.

In an alternative arrangement, the network is organized as two or more hierarchies. Referring to FIG. 2, at the lowest hierarchy (level 1), a client device (200, 201, . . . , 209) is equipped with a wireless interface unit running a networking protocol to communicate with the wireless nodes (e.g. routers or switches 220a, 221a, 222a, 223a) in the next hierarchy (level 2a). Wireless nodes (220b, 221b, 222b, 223b) in level 2b can be interconnected by a separate set of wireless links (224, 225, 226, 227, 228) of the mesh network. Specifically, each level 2a node (220a, 221a, 222a, 223a) is connected to an adjunct node (220b, 221b, 222b, 223b) via a wire, or wireless, link (220, 221, 222, 223). These adjunct nodes in level 2b (220b 221b, 222b, 223b) form a mesh network that interconnects all the client (level 1) nodes (200, 201, . . . , 209) via the level 2a nodes (220a, 221a, 222a, 223a).

Furthermore, a level 2a node and its adjunct level 2b node can be combined into a single physical node, with two logical interfaces. Each of the logical interfaces can operate on separate physical interfaces, or separate channels (frequency) on the same physical interface.

Various techniques can be employed to determine the location of a wireless device, or node, within a wireless mesh network. In general, these techniques involve determining a distance, or angle, from known positions and using this information to determine the location of the device. In one technique, commonly referred to as triangulation, the geometric properties of a triangle are used to compute a device's location. In one example of triangulation, a rough estimate of a distance between known locations of nodes, or sensors, and the device are determined. Knowing the distance to the device from a node, or sensor, defines a circle centered on the node with a radius equal to the distance, and the device is somewhere on the circle. Knowing the distance from other nodes to the device defines additional circles and the device location is the intersection common to all of the circles.

The distance from a node to a device can be estimated is several different ways. On technique for estimating the distance is to use the strength of a signal received from the device at a node, or sensor, based upon a propagation path-loss model. Using signal strength to estimate distance of a traditional radio frequency ("RF") signal is highly susceptible to variations in received signal strength caused by propagation effects, such as fading and multipath. Techniques such as, RF-finger printing, probabilistic modeling of RF signals, and Kalman filtering are sometimes used to ameliorate the effects of multipath and fading to improve the estimate of distance and thereby improve the accuracy of the triangulation technique.

Another technique used in determining the distance to a device is time of arrival ("TOA"). In TOA, a relative distance to an object is computed by accurately calculating the time it took for a signal to travel from the object to a sensor. To determine the distance based upon the time of travel of the signal, in addition to knowing the time it took for the signal to travel the distance, the speed that the signal travels also needs to be known. If the signal is a radio wave, then its speed is the speed of light, or about 300 meters per microsecond. A limitation to this technique is that it requires that the starting time of the transmission be known, and that all the nodes in the network be accurately synchronized.

A variation of the TOA technique is a technique referred to as time difference of arrival ("TDOA"). The TDOA technique uses relative time measurements rather than absolute time measurements. Using a process called trilateration, the location of the device is determined by measuring the signal arrival times from pairs of receiving antennae, and subtracting the arrival times to calculate relative timing. Each time difference from each pair of antennae places the transmitter on a hyperbolic curve. The location of the mobile device can be determined from the intersection of two hyperbolic curves.

Another technique used in determining the location of a device is angle of arrival. This technique is based on calculating the angle of a signal sent by the device as it arrives at a node. A minimum of two nodes (i.e. receivers) are required to determine the position of the device, which is located at the intersection of lines extending from the node at the calculated angle. More than two nodes can give higher precision. A complex calibrated antenna array is usually needed at each receiving site in order to measure the angle of arrival, thus making this technique expensive to implement for small scale location sensing such as for indoor positioning Still another technique for determining the location of a device is the Global Positioning System ("GPS"). The GPS is a system maintained by the U.S. Government that includes a constellation of low earth orbiting satellites that continually transmit timing signals that are precisely synchronized to each other. At a GPS receiver the signals from multiple satellites are received and from the relative timing of the signals, the time of travel of the signal can be determined. Then, using a technique similar to TOA described above, the GPS receiver can determine its location. While GPS provides world wide coverage, and is very accurate, the GPS signals are very weak and are difficult to receive inside of buildings and other structures making it of limited use in location sensing in indoor environments.

Figure 3:
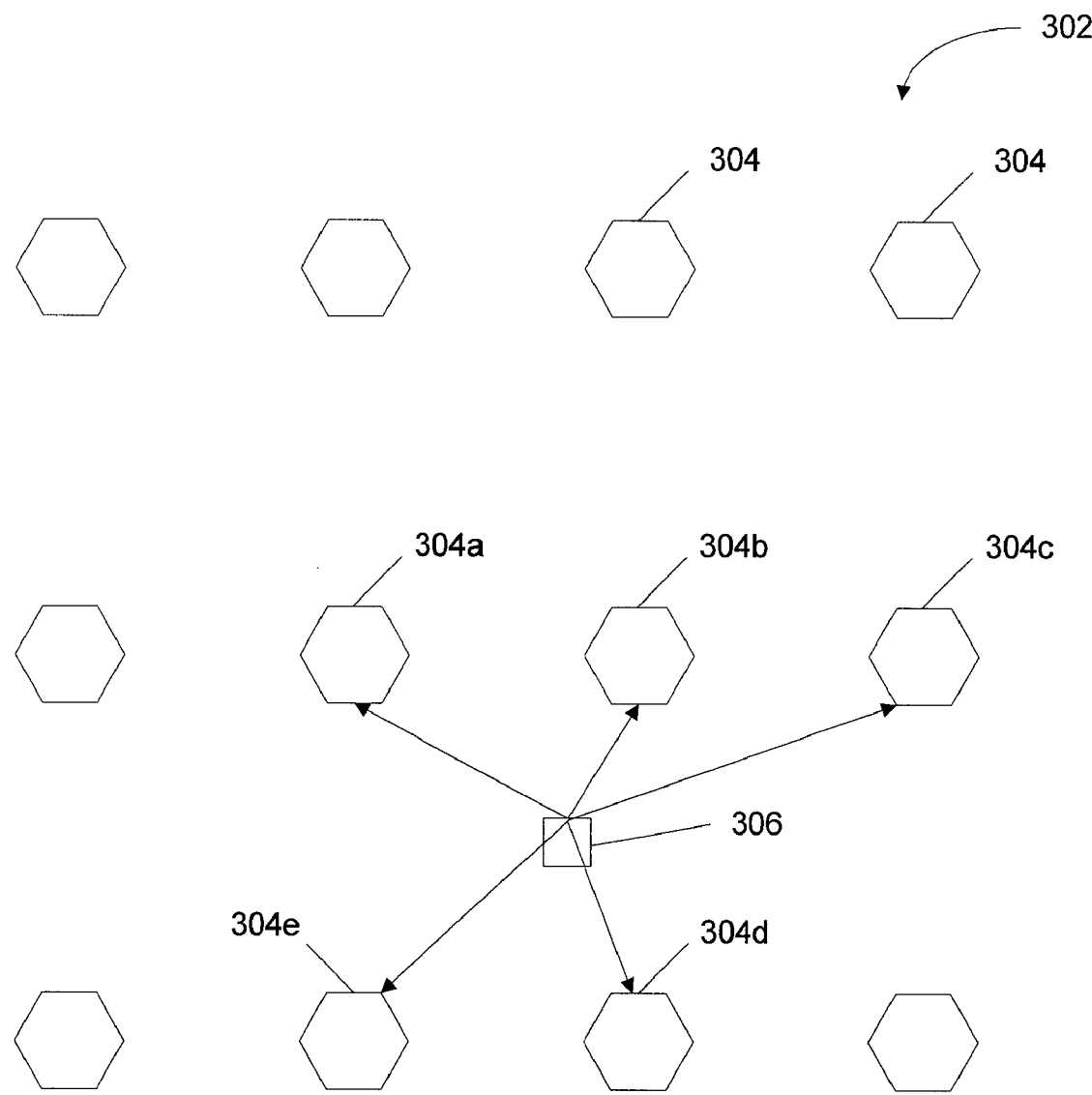
FIG. 3 is a network diagram illustrating aspects of a technique for determining a location of a device within a wireless network.

FIG. 3 is a network diagram illustrating aspects of a technique for determining a location of a device within a wireless network such as a wireless mesh network. Implementation of location sensing in a wireless network may be eased because of characteristics of the network. For example, an advantage provided by mesh networks is that nodes (mesh routers) are typically, more or less stationary.

Several location based applications, from a networking or customer point of view, may be possible with location information. For example, a company can track assets, such as computer equipment, printers, etc. Likewise, a hospital can provide network devices to doctors enabling the hospital to quickly locate the doctor. From a network perspective, location based routing may be more practicable in a wireless mesh network. Location based routing can help establish more robust networks with little protocol overhead. Similarly, certain MAC layer implementation can be made simpler. Roaming may also benefit because roaming decision can be based upon the location, and direction of travel, of a client device determined from stationary mesh routers. As illustrated, customers of wireless networks can greatly benefit from location information.

Returning to the example illustrated in FIG. 3, the network 302 can include network nodes 304 and mobile wireless devices 306. In this example there is only one mobile device 306 illustrated for simplicity, however, a network 302 would typically include multiple mobile wireless devices 306.

In an embodiment, the network 302 includes a coordinate system that can identify each of the network nodes 304 and its corresponding location. In one embodiment, the coordination process is performed in a mesh controller (not shown). In another embodiment, the coordination process is performed by the individual network nodes 304. That is, each network node 304 identifies itself with a corresponding location.

In one embodiment, the location of a network node can be determined when the node is installed. In other words, the node's location can be entered into a coordinate system, or into the node, by a technician when installing the node. For example, the technician may enter the node's location as latitude and longitude, or as a location building, such as, 123 A Street, or the $5^{th}$ floor conference room, or both, or any other description of the location that would be useful, e.g. GPS location information.

The nodes can be fixed or mobile. For example, if a node is fixed its location can be determined when the node is installed. Likewise, if a node is mobile, its location can be determined as the node moves about. For example, the node can include a GPS receiver, or can use location determination techniques described herein, to determine the node's location.

In one embodiment location information can be sent to a device in the network. For example, a PBX at a fixed location within a building can provide the building location information to devices, such as phones or PCs connected to the network. In addition, techniques described can be used to determine the location of a device, such as a phone or PC, relative to nodes, such as PBXs and routers. Using PBXs, a device can initiate VoIP calls, instant messages (IM), or other services.

In still another embodiment, a device can display point of interest (POI) information based on its detected location. For example, desired POI web pages can be displayed on a device as the device moves about the network. A POI entry can be associated with, for example, a combination of a phone number, a URL, email address, or the other entities. These entries can be selected to activate a desired form of communication, such as VoIP, IM, and the like. In other embodiments peer-to-peer applications can provide information to users. For example, social networking, file sharing, and other types of applications can provide information exchange between peers or a network.

As shown in FIG. 3, a signal transmitted by the mobile wireless device 306 can typically be received by multiple nodes 304. In FIG. 3 the signal transmitted by the mobile device 306 is received at five nodes 304a-304e. Each node 304a-304e can measure characteristics of the received signal, such as signal strength, or timing information. For example, each node 304a-304e can measure the signal strength received from the device 306. Variations in signal strength depend, at least in part, on the distance between the node and the device. In the example of FIG. 3, the mobile device 306 is closest to node 304b, and the received signal strength may be, for example, 0.872 mW, or −0.59 dBm. The mobile device is next closest to node 304d, and the receive signal strength may be 0.824 mW, or −0.84 dBm. The next two closest nodes are 304e and 304a which may measure the received signal strength as 0.722 mW or −1.41 dBm and 0.709 mW or −1.49 dBm respectively. And device 306 is farthest from node 304c which may measure a signal strength of 0.242 mW, or −6.16 dBm.

The measured signal strengths from the various nodes 304a-304e can be provided to a location determination system. The location determination system can be included within one of the nodes 304 of the network 302, in a network controller (not shown), or in a device in communication with the network 302 such as a location server (not shown). The location determination system can be implemented as a module in one of the nodes or as a distributed module across several nodes (e.g. multiple nodes 304 in an ad hoc mesh network). The measured signal strengths can then be used to estimate the distance of the device 306 from each of the nodes 304a-304e. Knowing the distance from the nodes 304a-304e to the device 306, and knowing the location of the nodes 304a-304e, an estimate of the location of the device can be determined.

One technique for determining the location of the device is referred to as "weighting." In this technique, the "weight" of each location estimate is adjusted, or relied upon, based on a confidence level that the estimate is accurate. For example, the weight can be adjusted based upon the measurement of the characteristic of the received signal. In the case where the characteristic measured is received power level, a higher confidence level may be assigned to a higher power signal (i.e. sensors that are closer to the object being tracked). In this case, the weight may be inversely proportional to the nth power of the measured signal strength, in dBm, received by the node from the device 306. In other words, the value of n accentuates the importance of neighbors that are closer. The value of n will depend on the characteristics of the wireless technology being used (i.e. coverage range, frequency of operation, etc). In this way, higher weight can be given to sample points that are closer to the device 306. In the example above (for n=2), the signal strength measured at the closest node 304b to the device 306 was −0.59 dBm and the weight would be $1/(-0.59)^2=2.87$ while the signal strength measured at the farthest node 304e from the device 306 was −6.16 dBm and the weight would be $1/(-6.16)^2=0.03$. As this example shows, there is a higher weighting given to the nodes, or sample points, that are closer to the device 306. Equation 1, below, is an example expression for weighting:

$$(X_t,Y_t,Z_t)=[\Sigma\{1/ss_i^n*(X_i,Y_i,Z_i)\}]/\Sigma(1/ss_i^n) \qquad \text{Equation 1}$$

Where:
i—is the number of the nearest node;
$ss_i$—is the signal strength (in dBm) at the $i^{th}$ node; and
$(X_i,Y_i,Z_i)$—X, Y, Z 3D coordinates of the $i^{th}$ node.

Figure 4A:
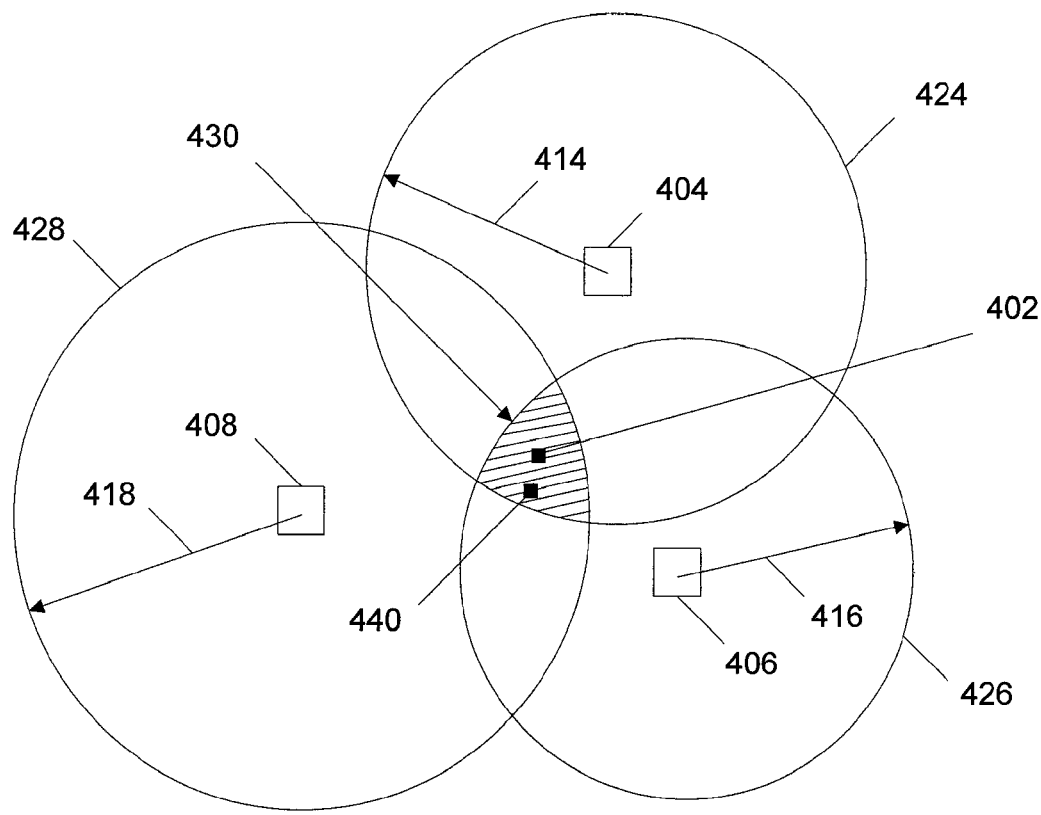
FIG. 4A is a network diagram illustrating aspects of another technique for determining a location of a device within the network.

Another technique for determining the location of the device is referred to as the "centroid of intersection" technique. In this technique, the insertion of several 'detection' circles (i.e. sensory samples) of possible locations of the device 306 can provide an improved estimate of the device's location. FIG. 4A is a diagram illustrating aspects of this technique for determining a location of a device within the network. As shown in the illustrated embodiment, a device 402 is in communication with three nodes 404, 406, and 408. Each of the three nodes 404, 406, and 408 receive signals from the device 402 and measure characteristic of the signal, such as, the strength or timing information of the received signal.

In the example, where the received signal strength is measured, an estimate of the distance between the device 402 and each of the nodes 404, 406, and 408 can be made based upon the measurement. For example the received signal strength received by the first node 404 may correspond to a distance 414 that defines a first circle 424 centered at the first node 404 with a radius equal to the estimated distance 414. The device 402 may be located anywhere on the circle 424. In addition, the signal strength received by the second node 406 may correspond to a distance 416 that defines a second circle 426 centered at the second node 406 with a radius equal to the distance 416. The device 402 may also be located anywhere on the circle 426. Likewise, the signal strength received by the third node 408 may correspond to a distance 418 that defines a circle 428 centered at the third node 408 with a radius equal to the distance 418. Again, the device 402 may be located anywhere on the circle 428. In other embodiments, other characteristics of the received signal can be measured and used to estimate a distance. For example, timing information may be measured and a distance estimated based on TOA or TDOA.

The three circles in FIG. 4A represent possible locations of the device 402. The most likely location of the device 402 is at a location that is common to all three circular regions 424, 426, and 428. In an ideal solution, the three circular regions 424, 426, and 428 would intersect at a single point. However, due to signal propagation effects such as multi-path and fading, as well as measurement inaccuracies, and other uncertainties, it is more common for the circles to intersect in a common region 430. In the example of FIG. 4A, the three circular regions 424, 426, and 428 overlap in a common region. It is also possible, that the three circular regions 424, 426, and 428 would not overlap because the estimated distances between the nodes and the device was too short.

Figure 4B:
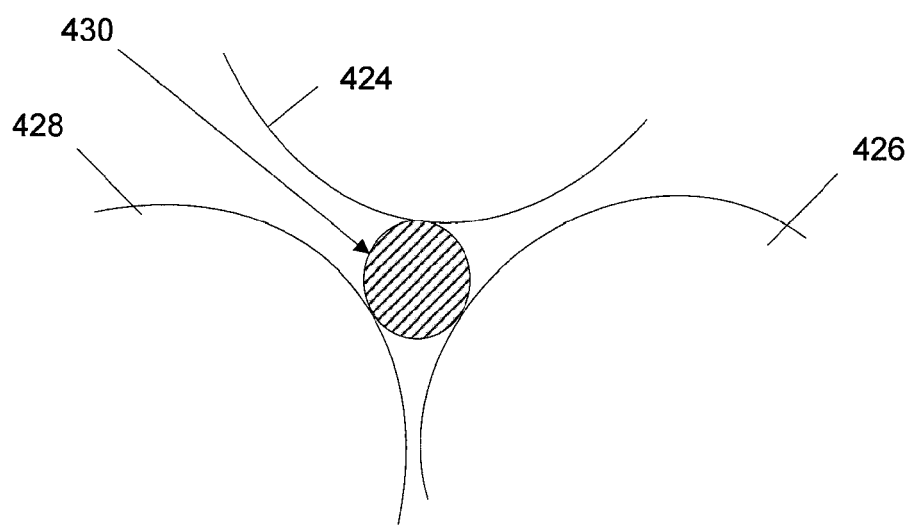
FIG. 4B is a network diagram illustrating aspects of another technique for determining a location of a device within the network.

FIG. 4B illustrates an example embodiment where the regions do not overlap. In this case the common region 430 would be considered the area that is in closest proximity to all three circles. Likewise, some circles may overlap while others do not, and the common region 430 would be the area that is closet to all three circles.

Various techniques can be used to estimate the location of the device 402 within the common region 430. One example, is to estimate that the device 402 is at the centroid of the common region 340 using Equation 2.

$$(X_t, Y_t, Z_t) = \text{Cntrd}\{I(C[(X_{t1}, Y_{t1}, Z_{t1}), R_{t1}] \cap C[(X_{t2}, Y_{t2}, Z_{t2}), R_{t2}] \cap \ldots \cap C[(X_{Nt}, Y_{Nt}, Z_{Nt}), R_{Nt}])\} \quad \text{Equation 2}$$

Where

Cntrd{A}—Centroid of area A

I (L∩M∩N)—Interesection between areas L, M, and N.

C [(X, Y, Z), R]—represents a circle with center at X, Y, Z and radius R

Use of the intersection of several detection circular areas provides a finer estimate of device location. As the number of samples increases, and corresponding circular regions increase, the accuracy of the estimated location can be improved. In addition, the precision of the estimated location is inversely proportional to the size of the intersection region. That is, a smaller intersection region may imply a higher confidence level in the estimated location.

Another technique that can be used to estimate the location of the device 402 within the common region 430 is weighting. As described above, weighting can be applied to give more weight to a distance estimate that has a higher confidence level. Referring to FIGS. 4A and 4B, in the example where weighting is based upon a stronger received signal level, if the signal level received at the first node 404 was the strongest and the signal level received at node 406 the weakest, then a weighting technique would bias the estimated location toward the circular location 424 based on the measurement made at node 404. Likewise, because signal level received at node 408 is greater than the signal level received at node 406, the location of the device 402 would be biased toward the estimated second location circular 424 based on the measurement made at node 408, but this bias would be less than the bias applied for node 404. In this example, the estimated location for the device 402 would be adjusted to a second location 440 to account for the weighting.

In another embodiment, the locations of devices may be determined within a wireless mesh network using ultra-wideband ("UWB") technology. Aspects of some of the physical characteristics of a UWB system provide the potential for precise location. For example, a typical indoor environment includes many objects, such as walls, partitions, desks, people moving around, and a variety of equipment. Location systems based on conventional RF technology, such as IEEE 802.11 or RFID, generally work poorly in indoor environments because they are plagued by multi-path distortion caused by radio signals reflecting from these objects. Multi-path distortion can easily lead to positioning errors of several meters. Location systems based upon UWB can typically give higher accuracy in an indoor environment because they are much less affected by multi-path distortion and their calculation may be based on a time of arrival.

A UWB signal can be sent in the form of very short pulses having a resolution in nano or pico seconds. The wide bandwidth of UWB signals implies a fine time resolution that gives them a potential for high-resolution positioning applications. As a result, a time-based location technique, such as TOA or TDOA, is practical in a UWB system.

Figure 5:
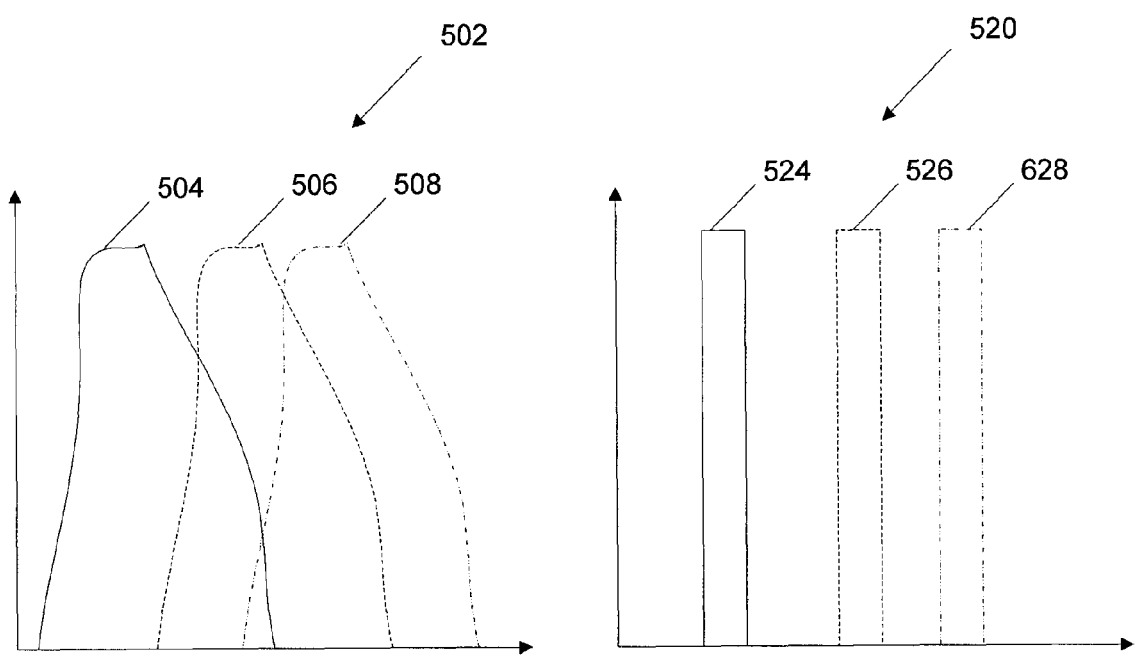
FIG. 5 is a diagram comparing the effect of multi-path upon traditional radio frequency signal and ultra wideband signals.

FIG. 5 is a diagram comparing the effect of multi-path distortion upon conventional, or traditional, RF and (UWB) signals. FIG. 5 illustrates the effect of multi-path on conventional, RF signals 502, such as the signals used in a network based upon IEEE 802.11. As shown in FIG. 5, multi-path distortion causes the conventional RF signal 504 to spread in time and can result in multi-path signals 506 and 508 overlapping the original RF signal 502 when the signals are received. The effects of multi-path distortion make it very difficult to separate, or filter, the original signal from the multi-path signal. Also shown in FIG. 5 is the effect of multi-path distortion on a UWB signal 520. A receiver will receive the original UWB signal 524 along with multi-path signals 526 and 528, but because of the short duration of the original signal, the multi-path signals 526 and 528 do not overlap the original UWB signal 524. Thus, in the UWB system the original signal 524 and the multi-path signals 526 and 528 can be easily separated and identified.

Because of the difficulty in conventional RF systems to separate the original and multi-path signals, these systems are generally limited to determining location based upon techniques that sense signal strength rather than time-based location position techniques which are generally more accurate. Also important to note, is that the accuracy of a time-based approach can be improved by increasing the signal to noise ratio ("SNR") or the effective signal bandwidth. UWB signal have very large bandwidths, and hence it allows them to give extremely accurate location estimation.

An advantage of a UWB based positioning system is that it does not require additional infrastructure to convert network nodes into location sensors. In a UWB system there is a synchronization process where nodes and devices of the UWB network are synchronized. During the synchronization process, timing information, such as the time delay between sender and receiver, can be determined. Based on this time delay, the distance "d" between the sender and the receiver can be determined by multiplying the time delay by the speed of light (i.e., the speed of the signal). Thus, the location of a device can be determined as being "d" meters from a UWB node. Then, using techniques described, the location of the device can be determined. Generally, the accuracy of such a system is equal to the radius of coverage (i.e. the distance "d"). Thus, if the node is operating in high power mode, the accuracy for faraway nodes will be poor.

Figure 6:
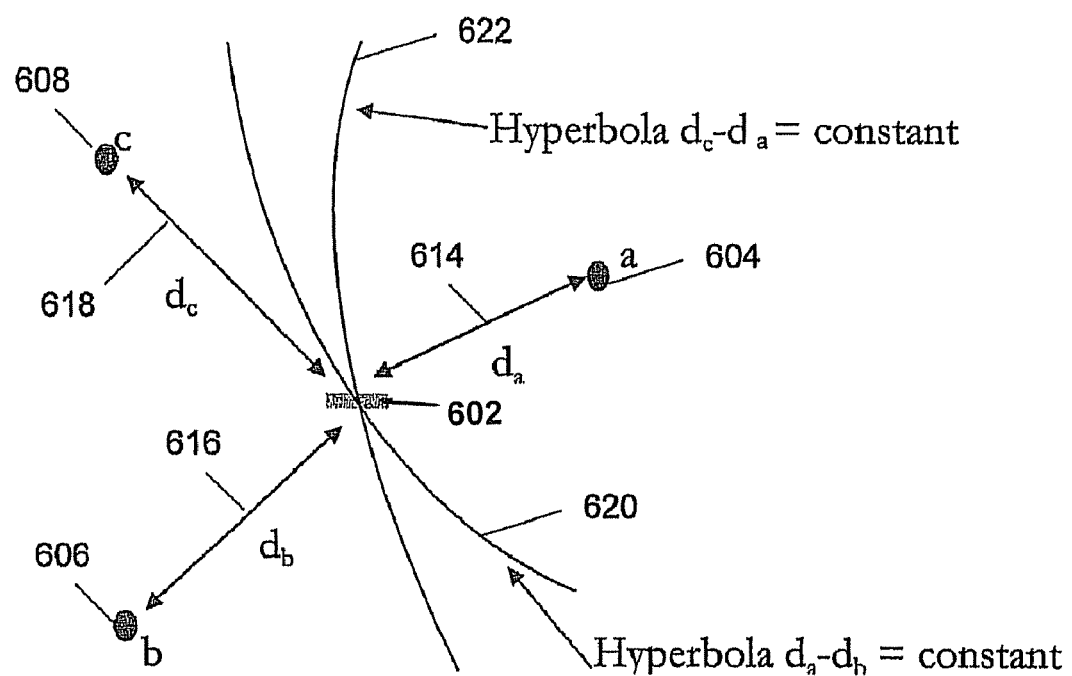
FIG. 6 is a diagram illustrating further detail of determining the location of a device within an ultra wideband network.

FIG. 6 is a diagram illustrating further detail of determining the location of a device within an ultra-wideband network based on a TDOA technique. Using a TDOA-based approach can improve the accuracy because more than one node is able to sense the tracked device. In the example shown in FIG. 6, a device 602 is in communication with three nodes 604, 606, and 608. A relative difference of the distance between the device and multiple nodes can be determined. The location of the device 602 can be determined by defining hyperbola curves where the difference between the distance from two nodes to the device 602, as determined by TDOA technique, is a constant. Shown in FIG. 6 is a first hyperbolic curve 620 defined by the difference between the distances from the device to the first node 604 and the second node 606 being constant. Likewise, a second hyperbolic curve 622 is defined by the difference between the distances from the device to the first node 604 and the third node 608 being constant. The location of the device 602 can then be determined at the intersection of the two hyperbolic curves 620 and 622.

In this technique, the accuracy of the location is based in part upon the separation of the nodes. That is, if the nodes are also closely located then the hyperbolic curves will lay closely to each other making it more difficult to determine the location of the device 602. On the other hand, if the nodes are spread apart from each other, such as shown in the example of FIG. 6, an accurate location can be determined. In a typical UWB mesh network a high density deployment of UWB nodes in a given area is generally available, making this TDOA based approach practical.

To further improve the accuracy of the system, a variable power level can be used at each UWB mesh node. This technique greatly improves the accuracy of the system by creating intersecting areas among different nodes. By changing the power level, a single node would be able to "see" several client devices at different ranges and aid in the TDOA accuracy.

Figure 7:
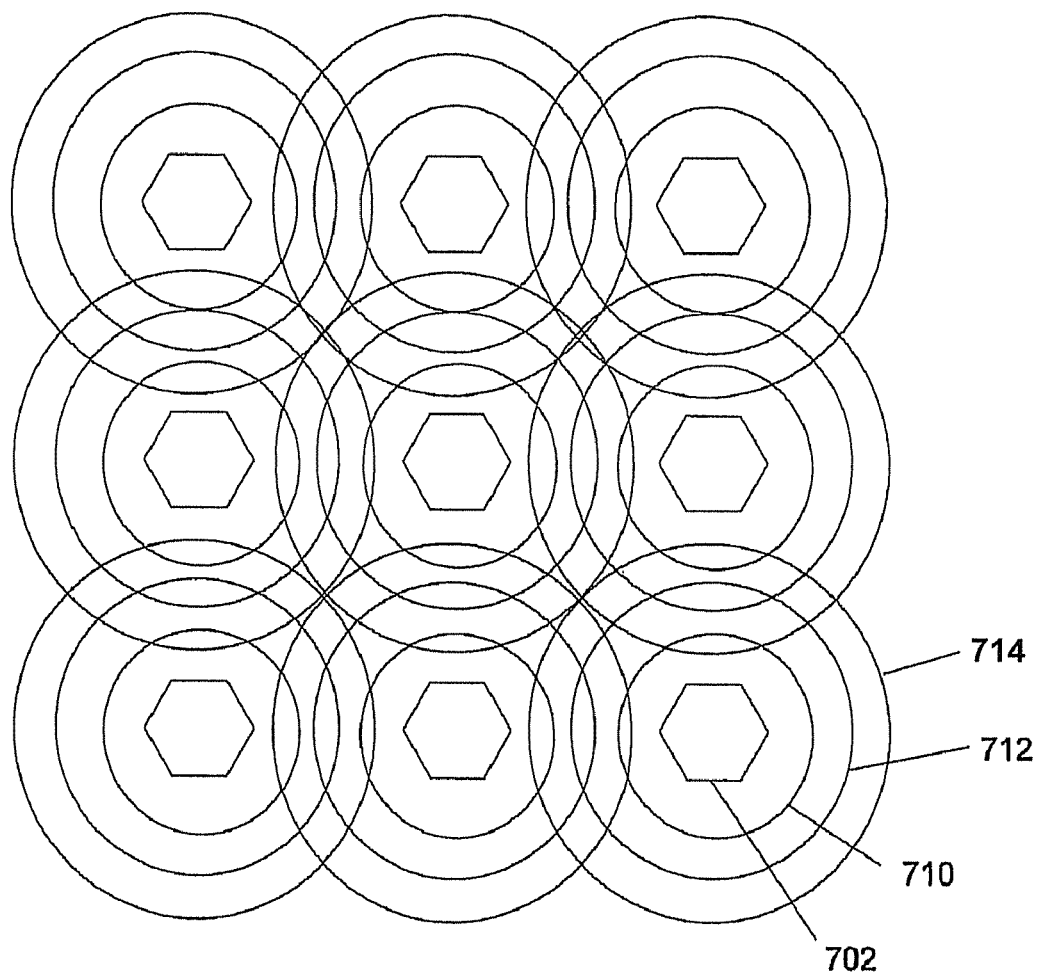
FIG. 7 is a network diagram illustrating an example wireless mesh network diagram with variable power levels.

FIG. 7 is a network diagram illustrating an example wireless network diagram with variable power levels. As showing FIG. 7, the network includes multiple UWB nodes 702. Each UWB node 702 can transmit at a first power level and thereby cover a first region 710. If the UWB node transmits at a second, higher power level, the coverage region will be increased to a second coverage region 712. Likewise, if the UWB node transmits at a third, still higher power level, the coverage region will be increased to a third coverage region 714. In the example of FIG. 7, three different power levels are shown, but it is envisioned that any number of power levels can be used. In addition, FIG. 7 shows an example where all of the UWB nodes 702 use the same three power levels. In other embodiments, different UWB nodes can use different power levels. Also, in the example of FIG. 7, the coverage areas are shown as circular for simplicity, but in an actual system the coverage areas can be formed into other shapes.

Transmitting at various power levels provides a variety of intersection patterns. FIG. 7 shows an intersecting pattern for three different power levels. The TDOA data collected from various nodes and devices within the network coverage can be determined based upon the signals received at the different power levels. In one embodiment, the data collected can be sent to a backend location server (not shown) which can compute the location of the devices. This server can also hold the current location of each node, thus providing a real time location of each device.

Knowledge about a device as well as the physical characteristics of a region where the device is located can be used in combination with the techniques described to determine a location of a device. For example, if it is known, or determined, that a device is located within an office building, then it may be possible to use the fact that if the device is not in a stairway or elevator, then the device's location is restricted to individual floors of the building.

Figure 8:
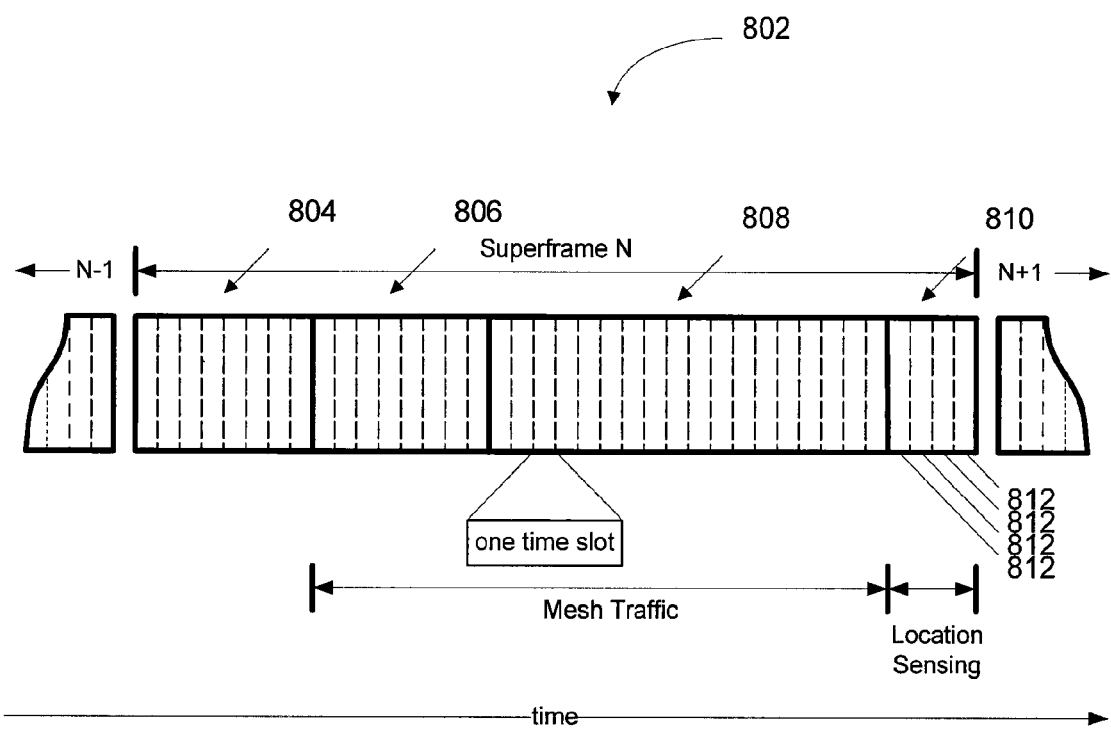
FIG. 8 is a block diagram illustrating an example media access control ("MAC") protocol superframe in accordance with an embodiment of the invention.

FIG. 8 is a block diagram illustrating an example media access control ("MAC") protocol superframe in accordance with an embodiment of the invention. The superframe illustrated in FIG. 8 is a modification to the standard UWB MAC and is adapted to support the location sensing functionality. Each superframe 802 includes a beacon period 804, a contention access period 806, a contention free period 808, and a variable signal level period 810.

During the beacon period 804, signaling messages are passed around among the nodes in the wireless network. Each node sends a beacon signal during this period so that new nodes joining the network can identify the set of neighbor nodes. The beacon signal includes information about the sender node as well as information from its own neighbor list to facilitate the propagation of network topology information to all nodes in the network. During the contention access period 806, the nodes in the network collaboratively assign timeslots for communication during the contention free period and identify routes where necessary for reliable end-to-end communications. The assignment of timeslots among the nodes is done in an interleaved fashion in order to optimize the use of spectrum amongst all nodes in the network and ensure the highest throughput and quality of service. During the contention free period 808, the nodes in the network send and receive data communications during the various timeslots under a TDMA paradigm.

The variable signal level period 810 is a period of time in the superframe 802 that is set aside for varying the signal strength of the UWB nodes. During the variable signal level period 810 there are a plurality of time slots 812. In one embodiment, the "variable signal" time slots 812 have the same power level for a given superframe, that is, it doesn't change in a superframe. During the next superframe there may be a different power level during the timeslots 812 of the variable power level period 810. In one embodiment, the power level in "variable power" time slots 812 periodically repeat to the same value. For example in the example with three power level variability, the fourth superframe can have the same power level as the first superframe. In other embodiments, the power level used in the variable signal level period 810 of different superframes 802 can be changed in other patterns. For example, the power level can incrementally increase through subsequent superframes until a maximum level is reached, then the power level can be incrementally decreased back to a minimum level, and this sequence can then be repeated. In other embodiments, other sequences of changing power levels can be used. In another embodiment, the power levels can be varied for different time slots 812 within the same variable power level period 810 of a superframe 802.

As noted, transmitting at various power levels provides a variety of intersection patterns that can be used to improve TDOA accuracy because a single sensor, or node, will be able to "see" several clients at different ranges.

The techniques described can be used in a hierarchical scheme to smoothly integrate the techniques so that they work in combination. For example, an angle of arrival scheme can be used to quickly identify a region that a node is located within. Then a triangulation scheme could be used to further improve the accuracy of location. In this way, integration of the location techniques described can provide improved performance for determining a location estimation. In another example, in addition to use of weighting or centroid of intersection based on physical signals, network level information can be used to further improve the location estimation accuracy.

Further, the locations of nodes do not need to be fixed, or configured, in advance. In other words, the techniques can be used to determine the locations of both nodes and devices. This is another type of hierarchy of location estimation. Using this technique, some nodes, such as "anchor" nodes can be fixed and their locations can be configured in advance.

Figure 9:
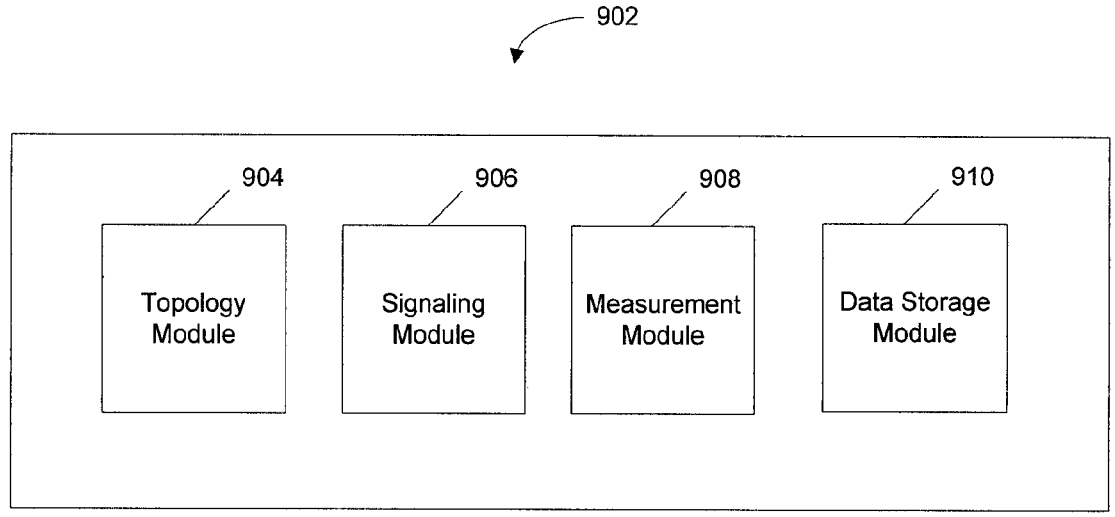
FIG. 9 is a block diagram illustrating an example wireless communication node according to an embodiment of the present invention.

FIG. 9 is a block diagram illustrating an example wireless communication node, or device, 902 according to an embodiment of the present invention. In the illustrated embodiment, the node 902 includes a topology module 904, a signaling module 906, and a measurement module 908. Node 902 also includes a data storage module 910 to store location information.

In the example of FIG. 9, the topology module 904 is configured to align the node's beacon signal with a mesh network. In one embodiment, when a UWB node joins a mesh network, the topology module 904 accomplishes alignment of the node's beacon signal with the mesh network by receiving and analyzing beacon signals from other nodes within wireless communication range and developing and maintaining a neighbor list that describes the current topology of the wireless network. For example, during the beacon period, the topology module 904 may receive five beacon signals. Of the five, perhaps only four are received with sufficient signal quality to be considered a neighbor node. Accordingly, each of the four beacon signals are analyzed by the topology module 904 to identify who the sender node is, what the signal quality is, who the sender node's neighbors are, and other useful information for determining the topology of the wireless network.

One aspect of determining the topology can be described with reference to the discarded fifth beacon signal described above. Since the sender node of that beacon signal is not a direct neighbor, one or more of the four beacon signals with sufficient quality may include the sender of the discarded fifth beacon signal as a neighbor. In such a case, the neighbor list can include the sender of the fifth beacon signal as a multi-hop neighbor with a path (i.e., the node(s) through which communications to the sender of the fifth beacon signal should go) that includes the neighbor with the highest signal strength between it and the sender of the fifth beacon signal. In this fashion, the topology module 904 can identify the various direct and multi-hop nodes within communication range to determine the topology of the wireless network such that high quality high bandwidth communications may take place.

The signaling module 906 is configured to send and receive MAC layer control and signaling messages. The signaling module 906 also implements optional layer-2 routing. Advantageously, layer-2 signaling and control messages are sent and received in the timeslots in the initial allocation and unicast signaling between nodes is employed by the layer-2 signaling module 906 in order to increase the reliability of signaling and delivery of control messages.

The measurement module 908 cooperates in determining the location of a device, or node. In one embodiment, the measurement module 908 receives measurement data from a device in the network about characteristics of a signal received by the device. In another embodiment, the measurement module 908 measures characteristics of a signal received from the device. The characteristic of the signal that are measured can include, for example, received signal strength, TOA, and TDOA.

In one embodiment, the measurement module 908 communicates the measurement data to a location server, where the measurement data is used in the determination of an estimated location of the device. In another embodiment, the measurement module 908 estimates the range from the node to the device and communicates the range estimate to the location server, where the estimate is used in the determination of an estimated location of the device. In still another embodiment, the measurement module 908 estimates the range from the node to the device and receives measurement data, or estimated ranges from other nodes, and the measurement module 908 uses the measurements, or range estimates, to determine of an estimated location of the device.

Figure 10:
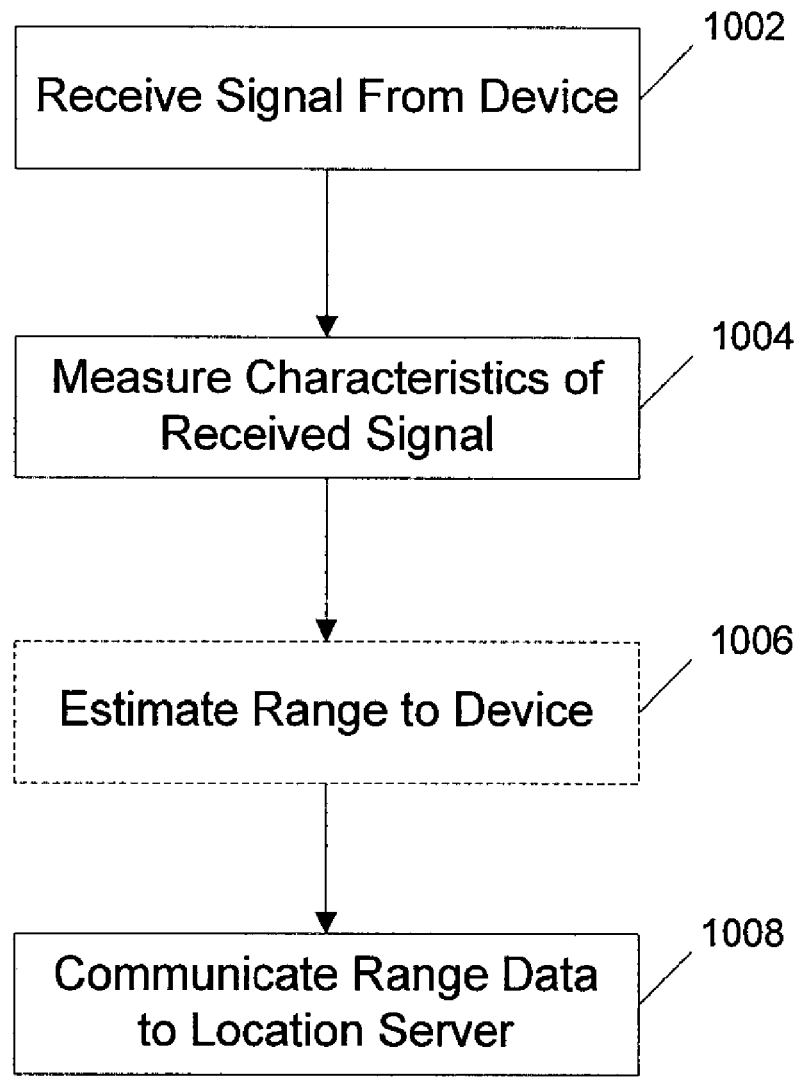
FIG. 10 is a flow diagram illustrating an example process for gathering information about a distance from a node to a device.

FIG. 10 is a flow diagram illustrating an example process for gathering information about a distance from a node to a device. The process can be implemented by a node, such as previously described in FIG. 9. Initially, in block 1002 a signal is received from the device. In one embodiment, the signal is an RF signal, such as may be used in IEEE 802.11 or RFID type devices. In another embodiment, the signal is an UWB signal.

In block 1004, characteristics of the received signal are measured. For example, the signal strength of the received signal may be measured. In another example, measurements of the signal timing may be made, such as the TOA, or TDOA. Then, in block 1008, the measurement data is communicated to a location server.

As an option, at block 1006, in addition to making measurements of the signal characteristics, an estimated range to the device is determined based upon the measurements. The estimated range is then communicated to the location server at block 1008.

Figure 11:
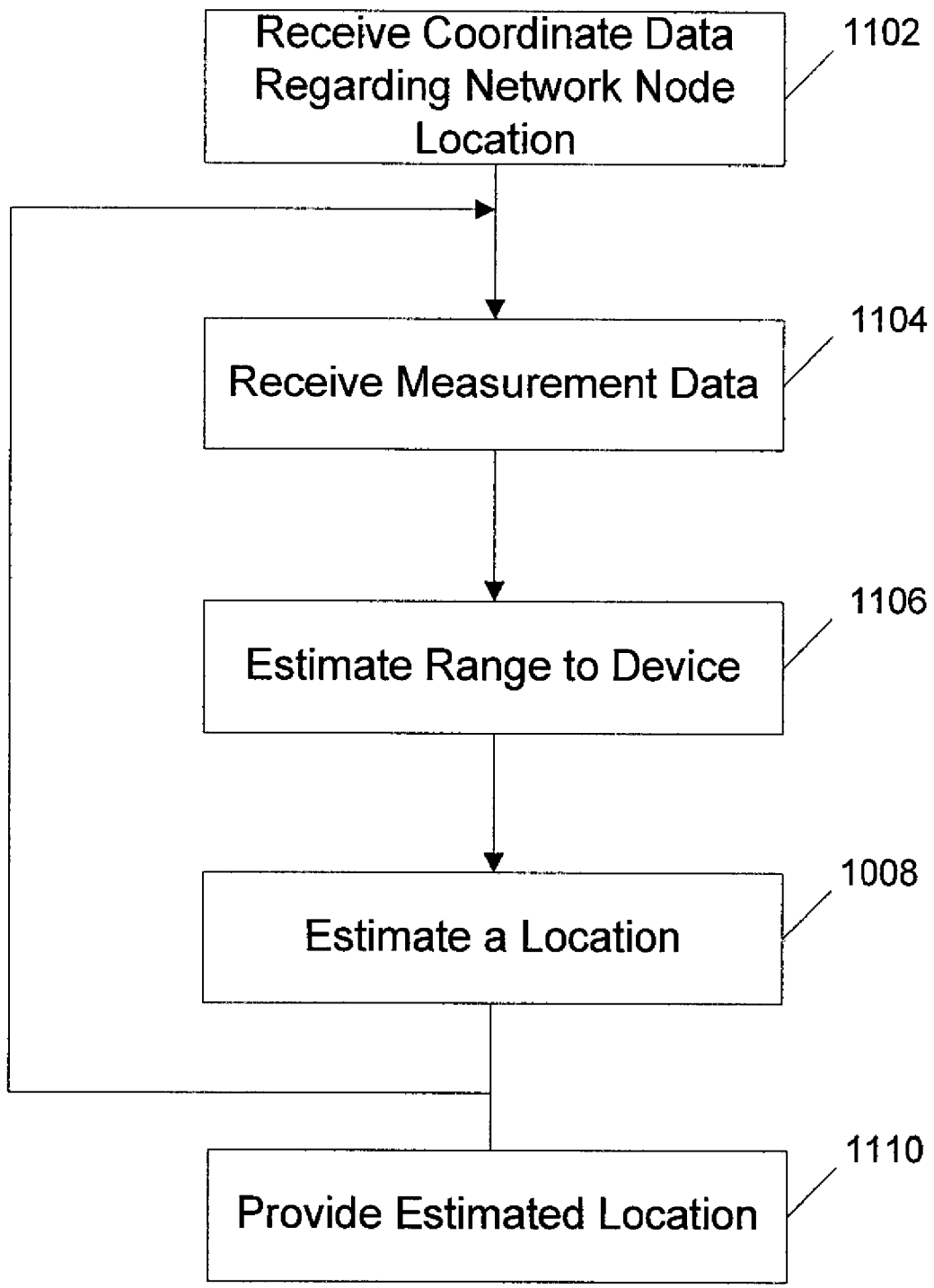
FIG. 11 is a flow diagram illustrating an example process for determining an estimate of a location of a device within a network.

FIG. 11 is a flow diagram illustrating an example process for determining an estimate of a location of a device, or node, within a network. The process can be implemented by a node configured as a location server such as previously described in FIG. 9. Initially, in block 1102 network coordination information is received. The coordination information can identify nodes within the network and their corresponding locations.

In block 1104, measurement data of characteristics of a signal received from the device a node in the network is received. The measurement data can include measurements of the strength of a signal received fro the device. In another example, timing measurements of the signal may be made, such as the TOA, or TDOA. Measurement data can also be received from multiple nodes. Then, at block 1106, a range from a node to the device is estimated based upon the measurement data.

Then, in block 1108, an estimate of the location of the device is made based upon the range estimates and measurement data. For example, a location estimate can be based upon triangulation or trilateration. In addition, techniques such as weighting and centroid, both individually and in combination, can be used. In block 1110 the estimated location can be provided to a user, to the device itself, or stored in a data storage area.

Returning to block 1108, after the location of the device has been estimated, flow can continue to block 1104 and new data of signals received from the device can be measured. This allows the device location to be updated so that a device can be tracked as it moves about within the coverage area of the network.

Once the location of the device is determined, various location based services can be provided to the device. For example, the device could be notified about other network devices that are in its proximity, or about network equipment that in nearby, or directions to a desired location, etc. In one example, the device can be notified that other devices, such as in a "buddy list" that are near by so that individuals can meet. In another example, a device can be notified that network equipment, like a printer, is nearby and available for use. In still another example, a device can be provided directions to a location, such as an office, meeting room, restroom, or the like.

Figure 12:
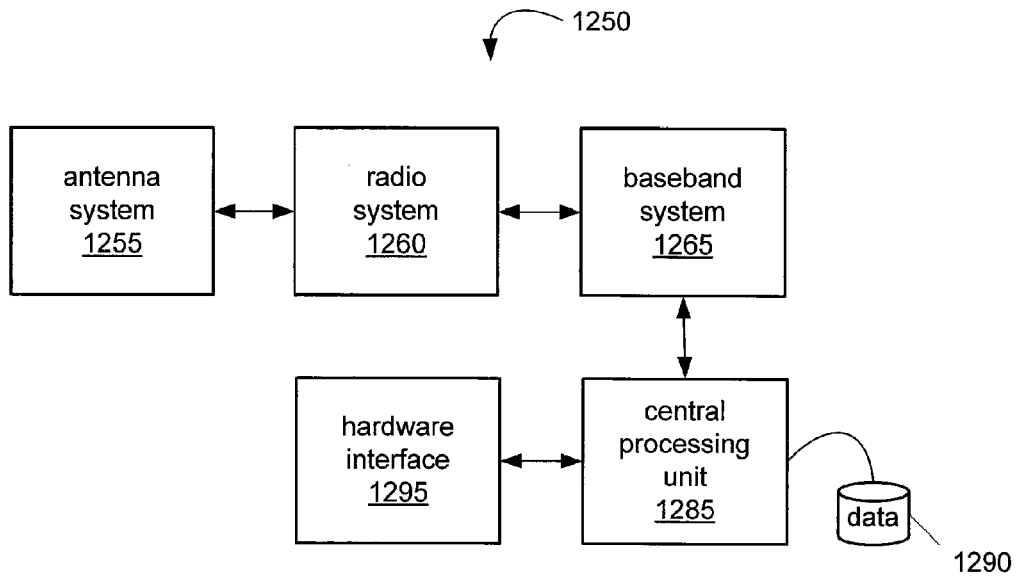
FIG. 12 is a block diagram illustrating an example wireless communication device that may be used in connection with various embodiments described herein.

FIG. 12 is a block diagram illustrating an example wireless communication device 1250 that may be used in connection with various embodiments described herein. Other wireless communication devices and/or architectures may also be used, as will be clear to those skilled in the art.

In the illustrated embodiment, wireless communication device 1250 comprises an antenna system 1255, a radio system 1260, a baseband system 1265, a central processing unit ("CPU") 1285, a data storage area 1290, and a hardware interface 1295. In one embodiment of the wireless communication device 1250, RF signals are transmitted and received over the air by the antenna system 1255 under the management of the radio system 1260. In another embodiment of the wireless communication device 1250, UWB signals are transmitted and received over the air by the antenna system 1255 under the management of the radio system 1260.

In one embodiment, the antenna system 1255 may comprise one or more antennae and one or more multiplexors (not shown) that perform a switching function to provide the antenna system 1255 with transmit and receive signal paths. In the receive path, received signals can be coupled from a multiplexor to a low noise amplifier (not shown) that amplifies the received signal and sends the amplified signal to the radio system 1260.

In alternative embodiments, the radio system 1260 may comprise one or more radios that are configured to communication over various frequencies. In one embodiment, the radio system 1260 may combine a demodulator (not shown) and modulator (not shown) in one integrated circuit ("IC"). The demodulator and modulator can also be separate components. In the incoming path, the signal is demodulated leaving a baseband receive audio signal, which is sent from the radio system 1260 to the baseband system 1265.

The baseband system 1265 is also communicatively coupled with the central processing unit 1285. The central processing unit 1285 has access to a data storage area 1290. The central processing unit 1285 is preferably configured to execute instructions (i.e., computer programs or software) that can be stored in the data storage area 1290. Computer programs can also be received from the baseband processor 1265 and stored in the data storage area 1290 or executed upon receipt. Such computer programs, when executed, enable the wireless communication device 1250 to perform the various functions of the present invention as previously described.

In this description, the term "computer readable medium" is used to refer to any media used to provide executable instructions (e.g., software and computer programs) to the wireless communication device 1250 for execution by the central processing unit 1285. Examples of these media include the data storage area 1290, antenna system 1255 (via the baseband system 1265), and hardware interface 1295. These computer readable mediums are means for providing executable code, programming instructions, and software to the wireless communication device 1250. The executable code, programming instructions, and software, when executed by the central processing unit 1285, preferably cause the central processing unit 1285 to perform the inventive features and functions previously described herein.

The central processing unit 1285 is also preferably configured to receive notifications from the hardware interface 1295 when new devices are detected by the hardware interface. Hardware interface 1295 can be a combination electromechanical detector with controlling software that communicates with the CPU 1285 and interacts with new devices. The hardware interface 1295 may be a firewire port, a USB port, a Bluetooth or infrared wireless unit, or any of a variety of wired or wireless access mechanisms. Examples of hardware that may be linked with the device 1250 include data storage devices, computing devices, headphones, microphones, and the like.

Figure 13:
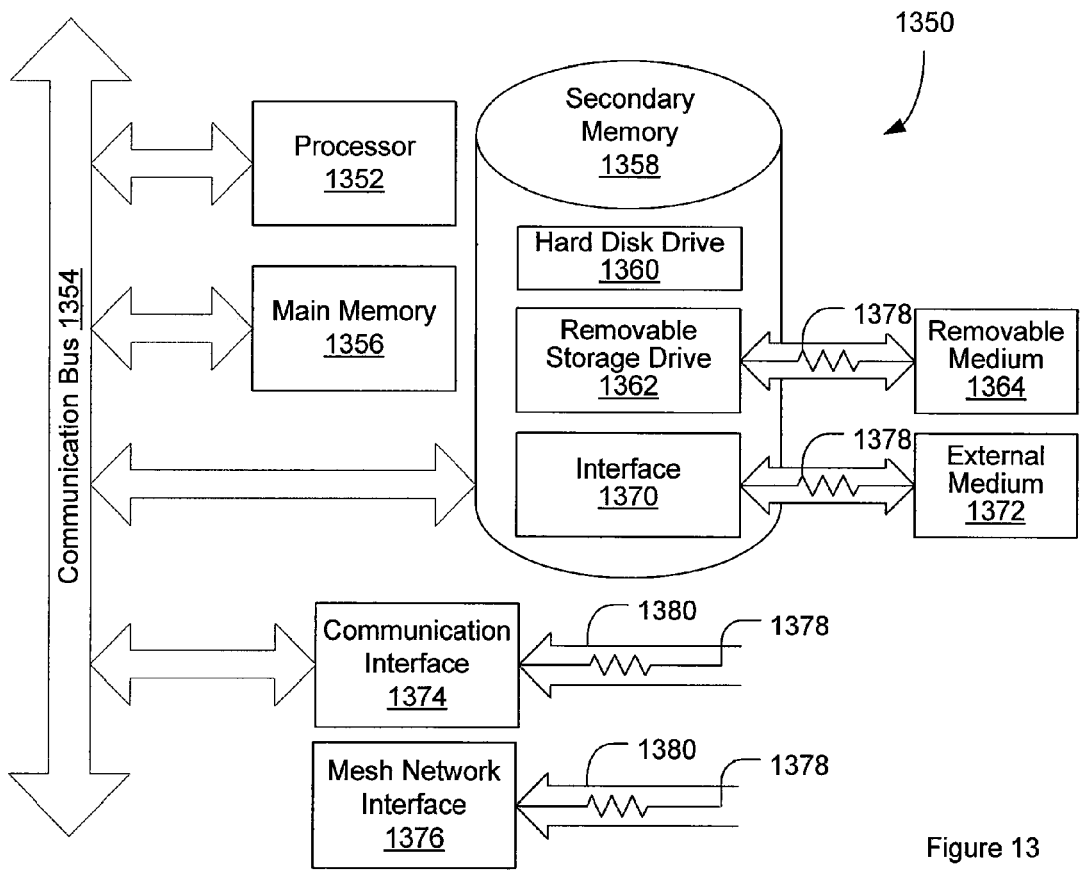
FIG. 13 is a block diagram illustrating an example computer system that may be used in connection with various embodiments described herein.

FIG. 13 is a block diagram illustrating an example computer system 1350 that may be used in connection with various embodiments described herein. For example, a location server can be implemented in a computer system as illustrated in FIG. 13. Other computer systems and/or architectures may be used, as will be clear to those skilled in the art.

The computer system 1350 preferably includes one or more processors, such as processor 1352. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 1352.

The processor 1352 is preferably connected to a communication bus 1354. The communication bus 1354 may include a data channel for facilitating information transfer between storage and other peripheral components of the computer system 1350. The communication bus 1354 further may provide a set of signals used for communication with the processor 1352, including a data bus, address bus, and control bus (not shown). The communication bus 1354 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 1350 preferably includes a main memory 1356 and may also include a secondary memory 1358. The main memory 1356 provides storage of instructions and data for programs executing on the processor 1352. The main memory 1356 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 1358 may optionally include a hard disk drive 1360 and/or a removable storage drive 1362, for example a floppy disk drive, a magnetic tape drive, a compact disc ("CD") drive, a digital versatile disc ("DVD") drive, etc. The removable storage drive 1362 reads from and/or writes to a removable storage medium 1364 in a well-known manner. Removable storage medium 1364 may be, for example, a floppy disk, magnetic tape, CD, DVD, etc.

The removable storage medium 1364 is preferably a computer readable medium having stored thereon computer executable code (i.e., software) and/or data. The computer software or data stored on the removable storage medium 1364 is read into the computer system 1350 as electrical communication signals 1378.

In alternative embodiments, secondary memory 1358 may include other similar means for allowing computer programs or other data or instructions to be loaded into the computer system 1350. Such means may include, for example, an external storage medium 1372 and an interface 1370. Examples of external storage medium 1372 may include an external hard disk drive or an external optical drive, or and external magneto-optical drive.

Other examples of secondary memory 1358 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 1372 and interfaces 1370, which allow software and data to be transferred from the removable storage unit 1372 to the computer system 1350.

Computer system 1350 may also include a communication interface 1374. The communication interface 1374 allows software and data to be transferred between computer system 1350 and external devices (e.g. printers), networks, or information sources. For example, computer software or executable code may be transferred to computer system 1350 from a network server via communication interface 1374. Examples of communication interface 1374 include a modem, a network interface card ("NIC"), a communications port, a PCMCIA slot and card, an infrared interface, and an IEEE 1394 fire-wire, just to name a few.

Communication interface 1374 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

The computer system 1350 may also include a mesh network interface 1376. In one example, the mesh network interface 1376 is a wireless interface to the mesh network. In another example, the mesh network interface 1376 is a wired interface to the mesh network, such as a wired interface to a node in the mesh network. In still another example, the interface between the computer system 1350 and the mesh network may be through the communication interface 1374.

Software and data transferred via communication interfaces 1374 and 1376 are generally in the form of electrical communication signals 1378. These signals 1378 are preferably provided to communication interface 1374 via a communication channel 1380. Communication channel 1380 carries signals 1378 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 1356 and/or the secondary memory 1358. Computer programs can also be received via communication interface 1374 and stored in the main memory 1356 and/or the secondary memory 1358. Such computer programs, when executed, enable the computer system 1350 to perform the various functions of the present invention as previously described.

In this description, the term "computer readable medium" is used to refer to any media used to provide computer executable code (e.g., software and computer programs) to the computer system 1350. Examples of these media include main memory 1356, secondary memory 1358 (including hard disk drive 1360, removable storage medium 1364, and external storage medium 1372), and any peripheral device communicatively coupled with communication interface 1374 (including a network information server or other network device). These computer readable mediums are means for providing executable code, programming instructions, and software to the computer system 1350.

In an embodiment that is implemented using software, the software may be stored on a computer readable medium and loaded into computer system 1350 by way of removable storage drive 1362, interface 1370, or communication interface 1374. In such an embodiment, the software is loaded into the computer system 1350 in the form of electrical communication signals 1378. The software, when executed by the processor 1352, preferably causes the processor 1352 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A method for estimating a location of a first wireless device within a wireless network, the method comprising:
    a second device receiving signal characteristic information in a transmission from each of one or more third wireless devices, each signal characteristic information received from each of the one or more third wireless devices including (i) measured signal characteristics of a first signal transmitted by the first wireless device at a first power level during a first variable signal level period of a first media access control (MAC) superframe and received at the respective third wireless device and (ii) measured signal characteristics of a second signal transmitted by the first wireless device at a second power level during a second variable signal level period of a second MAC superframe and received at the respective third wireless device, the second power level being different than the first power level;
    the second device estimating a range from the first wireless device to each of the respective one or more third wireless devices based upon the signal characteristic information received from the one or more third wireless devices; and
    the second device estimating a location of the first wireless device based upon the estimated ranges.

2. The method of claim 1, wherein the wireless network is a wireless mesh network.

3. The method of claim 1, wherein the first and second signals conform to IEEE802.11 standard.

4. The method of claim 1, wherein the first and second signals are ultra-wideband signals.

5. The method of claim 1, wherein the measured characteristic is one selected from the group consisting of strength of the received signal, time of arrival, and time difference of arrival.

6. The method of claim 1, wherein the estimating a location comprises one selected from the group consisting of triangulation, trilateration, weighting, and estimating the centroid of a region.

7. A first device in a wireless network for estimating a location of a second wireless device, comprising:
    a measurement module configured to:
        receive signal characteristic information in a transmission from each of one or more third wireless devices, each signal characteristic information received from each of the one or more third wireless devices including (i) measured signal characteristics of a first signal transmitted by the second wireless device at a first power level during a first variable signal level period of a first media access control (MAC) superframe and received at the respective third wireless device and (ii) measured signal characteristics of a second signal transmitted by the second wireless device at a second power level during a second variable signal level period of a second MAC superframe and received at the respective third wireless device, the second power level being different than the first power level;
        estimate a range from the second wireless device to each of the third wireless devices based upon the signal characteristic information received from the one or more third wireless devices; and
        estimate a location of the second wireless device based upon the estimated ranges.

8. The first device of claim 7, wherein the wireless network is a wireless mesh network.

9. The first device of claim 7, wherein the first and second signals conform with the IEEE802.11 standard.

10. The first device of claim 7, wherein the first and second signals comprise ultra-wideband signals.

11. The first device of claim 7, wherein the measured signal characteristic is one selected from the group consisting of strength of a received signal, time of arrival, and time difference of arrival.

12. The first device of claim 7, wherein the estimating a location comprises one selected from the group consisting of triangulation, trilateration, weighting, and estimating the centroid of a region.

13. The method of claim 1, wherein the second device comprises a second wireless device, the method further comprising:
    the second wireless device receiving the first signal transmitted by the first wireless device at the first power level;
    the second wireless device measuring a characteristic of the first signal;
    the second wireless device receiving the second signal transmitted by the first wireless device at the second power level; and
    the second wireless device measuring a characteristic of the second signal;
    the second wireless device estimating a range from the first wireless device to the second wireless device based upon the measured characteristics; and
    the second wireless device estimating a location of the first wireless device based upon the estimated ranges.

14. The method of claim 1, wherein the second device comprises a second wireless device, the method further comprising the second wireless device transmitting information to the first wireless device based upon the estimated location.

15. The first device of claim 7, wherein the first device comprises a first wireless device, the first device further comprising:
    a topology module configured to align a beacon signal of the first wireless device with the wireless network;
    a signaling module configured to send and receive data communications over the wireless communication network with the one or more third wireless devices.

16. An article of manufacture including a non-transitory computer readable medium having instructions stored thereon that, in response to execution by a computing device, cause the computing device to perform operations for estimating a location of a first wireless device within a wireless network, the operations comprising:

receiving signal characteristic information transmitted by each of one or more second wireless devices, each signal characteristic information received from each of the one or more second wireless devices including (i) measured signal characteristics of a first signal transmitted by the first wireless device at a first power level during a first variable signal level period of a first media access control (MAC) superframe and received at the respective second wireless device and (ii) measured signal characteristics of a second signal transmitted by the first wireless device at a second power level during a second variable signal level period of a second MAC superframe and received at the respective second wireless device, the second power level being different than the first power level;

estimating a range from the first wireless device to each of them respective one or more second wireless devices based upon the information received from the one or more second wireless devices; and estimating a location of the first wireless device based upon the estimated ranges.

17. The article of manufacture of claim 16, wherein the first and second signals are ultra-wideband (UWB) signals.

18. The article of manufacture of claim 16, wherein the measured characteristic is one selected from the group consisting of strength of the received signal, time of arrival, and time difference of arrival.

19. The article of manufacture of claim 16, wherein the estimating a location comprises one selected from the group consisting of triangulation, trilateration, weighting, and estimating the centroid of a region.

20. The article of manufacture of claim 16, wherein the operations further comprise transmitting information based upon the estimated location to the first wireless device.

21. The method of claim 1, wherein the first MAC superframe and the second MAC superframe are the same MAC superframe.

22. The method of claim 1, wherein the first MAC superframe and the second MAC superframe are different MAC superframes.

23. The method of claim 1, wherein the MAC superframe further comprises:
 a beacon period;
 a contention access period; and
 a contention free period.

24. The method of claim 1, further comprising the first wireless device transmitting a third signal at a third power level during a third variable signal level period of a third MAC superframe, the third power level being different than the first and second power levels.

25. The method of claim 1, further comprising, responsive to transmitting the first and second signals, the first wireless device receiving information based upon an estimated location of the first wireless device.

26. The method of claim 1, wherein the first and second signals are ultra-wideband signals.

27. A method for estimating a location of a first wireless device within a wireless network, the method comprising:

a second wireless device measuring signal characteristics of a first signal transmitted by the first wireless device at a first power level during a first variable signal level period of a first media access control (MAC) superframe;

the second wireless device measuring signal characteristics of a second signal transmitted by the first wireless device at a second power level during a second variable signal level period of a second MAC superframe, the second power level being different than the first power level;

the second wireless device transmitting to a location server at least one of (i) the measured signal characteristics or (ii) a range estimated from the second wireless device to the first wireless device.

28. The method of claim 27, wherein the second wireless device transmitting to a location server at least one of (i) the measured signal characteristics or (ii) a range estimated from the second wireless device to the first wireless device comprises the second wireless device transmitting to the location server the measured signal characteristics.

29. The method of claim 27, wherein the second wireless device transmitting to a location server at least one of (i) the measured signal characteristics or (ii) a range estimated from the second wireless device to the first wireless device comprises the second wireless device transmitting to the location server the range estimated from the second wireless device to the first wireless device.

30. The method of claim 27, wherein the first and second signals transmitted by the first wireless device are transmitted during a variable signal level period of one or more MAC superframes.

31. A second wireless device in a wireless network configured to:

measure signal characteristics of a first signal transmitted by a first wireless device at a first power level during a first variable signal level period of a first media access control (MAC) superframe;

measure signal characteristics of a second signal transmitted by the first wireless device at a second power level during a second variable signal level period of a first media access control MAC superframe;

measure signal characteristics of a second signal transmitted by the first wireless device at a second power level during a second variable signal level period of a second MAC superframe, the second power level being different than the first power level;

transmit to a location server at least one of (i) the measured signal characteristics or (ii) a range estimated from the first wireless device to the second wireless device.

32. The second wireless device of claim 31, further configured to transmit to the location server the measured signal characteristics.

33. The second wireless device of claim 31, further configured to transmit to the location server the range estimated from the first wireless device to the second wireless device.

34. The second wireless device of claim 31, wherein the first and second signals transmitted by the first wireless device are transmitted during a variable signal level period of one or more MAC superframes.

35. An article of manufacture including a non-transitory computer readable medium having instructions stored thereon that, in response to execution by a computing device, cause the computing device to perform operations for estimating a location of a first wireless device within a wireless network, the operations comprising:

a second wireless device measuring signal characteristics of a first signal transmitted by the first wireless device at a first power level during a first variable signal level period of a first media access control (MAC) superframe;

the second wireless device measuring signal characteristics of a second signal transmitted by the first wireless device at a second power level during a second variable signal level period of a second MAC superframe, the second power level being different than the first power level; and the second wireless device transmitting to a location server at least one of (i) the measured signal characteristics or (ii) a range estimated from the second wireless device to the first wireless device.

36. The article of manufacture of claim 35, wherein the operations comprise transmitting to a location server the measured signal characteristics.

37. The article of manufacture of claim 35, wherein the operations comprise transmitting to a location server the range estimated from the second wireless device to the first wireless device.

38. The article of manufacture of claim 35, wherein the first and second signals transmitted by the first wireless device are transmitted during a variable signal level period of one or more MAC superframes.

39. The method of claim 1, further comprising
the second device receiving signal characteristic information in transmissions from each of a plurality of third wireless devices;
the second device estimating a range from the first wireless device to each of the respective plurality of third wireless devices based upon the signal characteristic information received from the plurality of third wireless devices; and
the second device estimating a location of the first wireless device based upon the estimated ranges.

40. The first device of claim 7, wherein the measurement module is further configured to:
receive signal characteristic information in transmissions from each of a plurality of third wireless devices;
estimate a range from the second wireless device to each of the respective plurality of third wireless devices based upon the signal characteristic information received from the plurality of third wireless devices; and
estimate a location of the first wireless device based upon the estimated ranges.

41. The article of manufacture of claim 16, wherein the operations further comprise:
receiving signal characteristic information in transmissions from each of a plurality of third wireless devices;
estimating a range from the first wireless device to each of the respective plurality of third wireless devices based upon the signal characteristic information received from the plurality of third wireless devices; and
estimating a location of the first wireless device based upon the estimated ranges.

* * * * *

UNITED STATES PATENT AND TRADEMARK OFFICE
CERTIFICATE OF CORRECTION

| | | |
|---|---|---|
| PATENT NO. | : 8,175,613 B2 | Page 1 of 1 |
| APPLICATION NO. | : 11/741630 | |
| DATED | : May 8, 2012 | |
| INVENTOR(S) | : Patil et al. | |

It is certified that error appears in the above-identified patent and that said Letters Patent is hereby corrected as shown below:

In Column 6, Line 23, delete "positioning" and insert -- positioning. --, therefor.

In Column 7, Line 28, delete "(IM)," and insert -- (IMs), --, therefor.

In Column 9, Line 37, delete "R" and insert -- R. --, therefor.

In Column 14, Line 39, delete "fro" and insert -- from --, therefor.

In Column 17, Line 7, delete "or and" and insert -- or an --, therefor.

In Column 17, Line 12, delete "erasable" and insert -- erasable programmable --, therefor.

In Column 17, Line 35, delete ""PCS"," and insert -- ("PCSs"), --, therefor.

In Column 21, Line 21, in Claim 16, delete "them" and insert -- the --, therefor.

In Column 23, Line 22, in Claim 39, delete "comprising" and insert -- comprising: --, therefor.

Signed and Sealed this
Eighteenth Day of September, 2012

David J. Kappos
*Director of the United States Patent and Trademark Office*